(12) United States Patent
Takakura et al.

(10) Patent No.: US 8,953,927 B2
(45) Date of Patent: Feb. 10, 2015

(54) DATA PROCESSING SYSTEM, APPARATUS AND METHOD FOR PROCESSING INFORMATION, RECORDING AND PLAYBACK APPARATUS, AND COMPUTER PROGRAM

(75) Inventors: Hiroki Takakura, Tokyo (JP); Koichi Uchida, Saitama (JP); Akihiro Kawachino, Kanagawa (JP)

(73) Assignee: Sony Corporation, Tokyo (JP)

( * ) Notice: Subject to any disclaimer, the term of this patent is extended or adjusted under 35 U.S.C. 154(b) by 2221 days.

(21) Appl. No.: 11/774,718

(22) Filed: Jul. 9, 2007

(65) Prior Publication Data

US 2008/0175565 A1 Jul. 24, 2008

(30) Foreign Application Priority Data

Jul. 14, 2006 (JP) ................. 2006-194904

(51) Int. Cl.
*H04N 5/765* (2006.01)
*H04N 5/77* (2006.01)
(Continued)

(52) U.S. Cl.
CPC .............. *H04N 7/50* (2013.01); *H04N 5/765* (2013.01); *G11B 27/034* (2013.01); *G11B 27/322* (2013.01); *H04N 19/00781* (2013.01); *H04N 5/85* (2013.01); *H04N 1/21* (2013.01)
USPC ........................... 386/232; 386/231; 386/224

(58) Field of Classification Search
CPC ....... G11B 27/034; G11B 37/322; H04N 7/50
USPC .................................. 386/231–242
See application file for complete search history.

(56) References Cited

U.S. PATENT DOCUMENTS

| | | | | |
|---|---|---|---|---|
| 6,833,866 | B1 * | 12/2004 | Suzuki .................. | 348/231.2 |
| 6,937,540 | B1 * | 8/2005 | Kikuchi et al. ......... | 369/30.03 |
| 2006/0051062 | A1 * | 3/2006 | Kusaka et al. ........... | 386/95 |
| 2007/0174570 | A1 * | 7/2007 | Horii et al. .............. | 711/163 |

FOREIGN PATENT DOCUMENTS

| | | |
|---|---|---|
| JP | 10-174032 | 6/1998 |
| JP | 2000-307911 | 11/2000 |
| JP | 2001-223980 | 8/2001 |
| JP | 2003-052006 | 2/2003 |

(Continued)

OTHER PUBLICATIONS

Japanese Office Action issued on Mar. 25, 2008.

*Primary Examiner* — Gelek W Topgyal
(74) *Attorney, Agent, or Firm* — Dentons US LLP

(57) ABSTRACT

A recording/playback apparatus including first and second recorders is connected to an information processing apparatus. The information processing apparatus transfers a first data stream file and a first management file used for managing the first stream file to the recording/playback apparatus. The first recorder records a second stream file and a second management file used for managing the second stream file thereon using a predetermined directory structure. The second recorder records the first stream file and the first management file transferred from the information processing apparatus thereon using the directory structure. After transferring the first stream file and the first management file to the second recorder, the information processing apparatus additionally records or updates the second stream file and the second management file respectively corresponding to the first stream file and the first management file on the first recorder based on the first stream file and the first management file.

26 Claims, 15 Drawing Sheets

(51) Int. Cl.
*H04N 9/80* (2006.01)
*H04N 19/61* (2014.01)
*G11B 27/034* (2006.01)
*G11B 27/32* (2006.01)
*H04N 5/85* (2006.01)
*H04N 1/21* (2006.01)

(56) References Cited

FOREIGN PATENT DOCUMENTS

| | | |
|---|---|---|
| JP | 2004-341630 | 12/2004 |
| JP | 2006-079467 | 3/2006 |

* cited by examiner

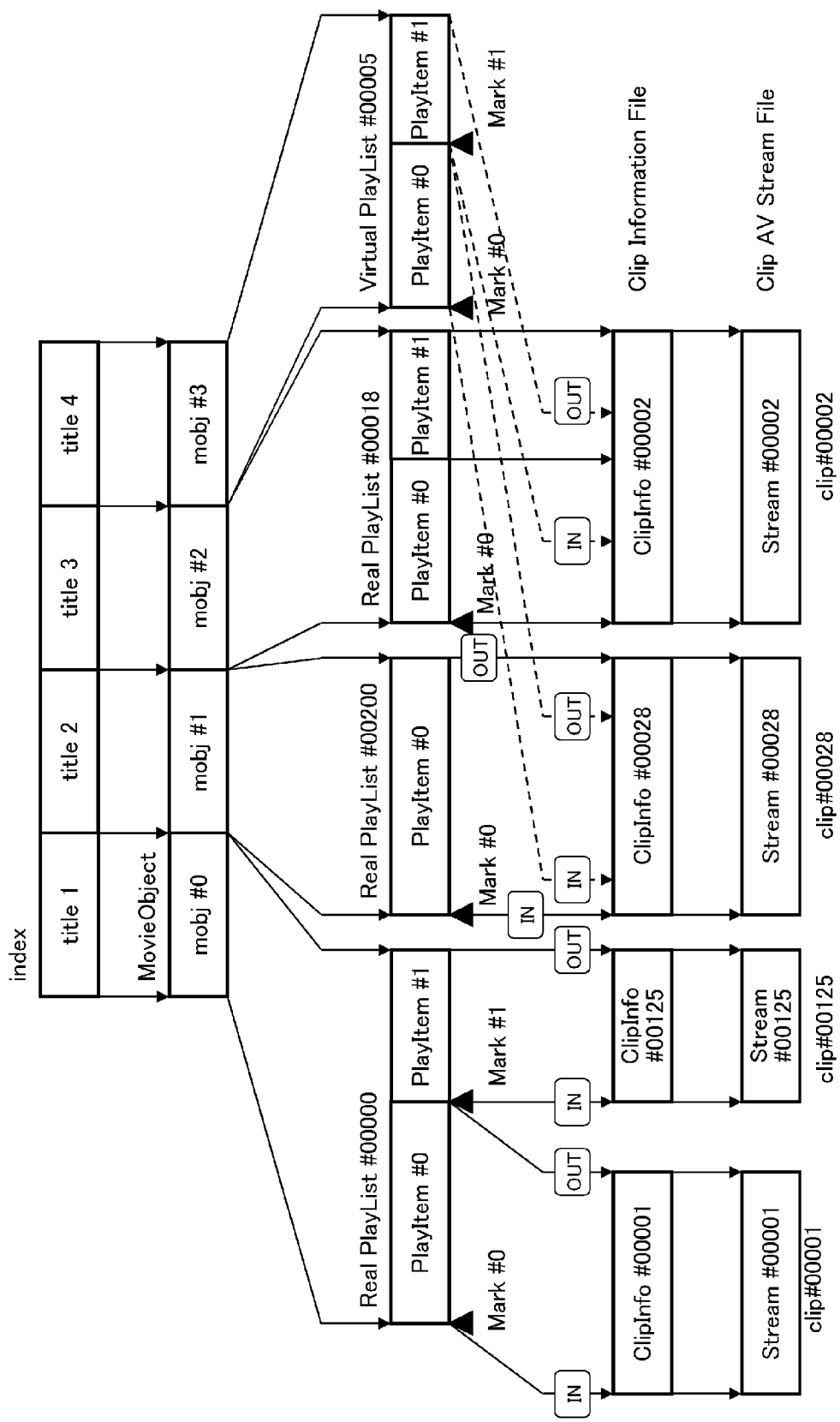

DATA PROCESSING SYSTEM, APPARATUS AND METHOD FOR PROCESSING INFORMATION, RECORDING AND PLAYBACK APPARATUS, AND COMPUTER PROGRAM

CROSS REFERENCES TO RELATED APPLICATIONS

The present invention contains subject matter related to Japanese Patent Application JP 2006-194904 filed in the Japanese Patent Office on Jul. 14, 2006, the entire contents of which are incorporated herein by reference.

BACKGROUND OF THE INVENTION

1. Field of the Invention

The present invention relates to a data processing system, an apparatus and a method for processing information, a recording and playback apparatus, and a computer program for storing, playing back, and transferring a data file. In particular, the present invention relates to a data processing system, an apparatus and a method for processing information, a recording and playback apparatus, and a computer program for storing, playing back, and transferring data collected from externally connected peripheral devices.

More particularly, the present invention relates to a data processing system, an apparatus and a method for processing information, a recording and playback apparatus, and a computer program for collecting content from an externally connected data recording and playback apparatus, such as a digital camera, as one of peripheral devices and for storing, playing back, and transferring (writing back) the content. Still more particularly, the present invention relates to a data processing system, an apparatus and a method for processing information, a recording and playback apparatus, and a computer program for collecting content from an externally connected data recording and playback apparatus serving as a peripheral device and for writing back the content to the data recording and playback apparatus in a format that is reconstructable by the data recording and playback apparatus.

2. Description of the Related Art

In recent years, with the increase in capacity and reduction in size and cost of hard disk drives (HDDs), HDDs have been installed in a variety of portable devices. For example, when an HDD of several tens of gigabytes is incorporated in a digital video camera, the digital video camera can record a moving image for several to several tens of hours. Furthermore, by using random access capability of an HDD, content in a moving image and a still image can be freely edited.

For example, a digital video camera has been proposed in which a camera unit are removably connected to a recording and playback unit including an optical disk recording and playback unit, a hard disk recording and playback unit, a removable hard disk recording and playback unit, or a tape recording and playback unit. A common connection interface and a common connection mechanism between such a recording and playback unit and the camera unit are employed so that a suitable encoding recording method is selected to record and playback an image (refer to, for example, Japanese Unexamined Patent Application Publication No. 10-174032). In addition, the recording and playback unit includes an encoding/decoding circuit supporting any two or more of the Motion JPEG, MPEG1, MPEG2, MPEG4, and DV formats and a switch for switching between the formats. Thus, one camera can record and play back an image while switching between two or more encoding/decoding methods.

In general, digital video cameras using an HDD as a recording medium employ a file system, such as the FAT (file allocation table) system, and record a captured image in the form of a file.

For example, a digital video camera has been proposed that includes a hard disk based on the FAT file system as a recording processing unit and that analyzes the FAT to detect information relating to a continuity of an available area of the hard disk (refer to, for example, Japanese Unexamined Patent Application Publication No. 2006-79467). Such a digital video camera can determine whether or not the hard disk is in a state suitable for recording data using the information relating to a continuity of an available area of the hard disk detected on the basis of a FAT analysis result.

In addition, a digital video camera may be connected to a personal computer via a universal serial bus (USB) cable. In such a case, a file of a captured image is transferred from the digital video camera to the personal computer. Thereafter, a variety of data processing can be performed using a feature-rich graphical user interface operational environment provided by the personal computer. Examples of the variety of data processing include image processing, such as storage, management, playback, image quality conversion of the image file, and image editing.

For example, the digital video camera DCR-SR100 available from Sony Corporation includes a 30-Gbyte HDD and records a standard definition (SD) image in the form of a moving picture experts group 2-program stream (MPEG2-PS) file. The recorded image can be played back by the digital video camera DCR-SR100. In addition, a video stream file can be copied into an HDD incorporated in a personal computer connected to the digital video camera DCR-SR100 via a USB cable.

Most of information recording and playback apparatuses including a HDD, such as digital video cameras, are connected to a personal computer as USB slaves. That is, a personal computer serving as a USB master recognizes a digital video camera as a mass storage device, that is, one of USB hard disks externally connected to the personal computer. Thus, the personal computer can access a file using a mass-storage class. While the digital video camera is being connected to the personal computer via a USB, the digital video camera cannot provide an image recording/playback function. The digital video camera only operates as a USB slave, that is, an external HDD.

For example, a digital camera has been proposed that primarily operates as a digital camera and additionally operates as a mass storage device capable of storing a large amount of data therein when connected to a personal computer (refer to, for example, Japanese Unexamined Patent Application Publication No. 2000-307911). The digital camera generates a file in the mass storage device immediately after an image file is captured. Accordingly, the personal computer can display the generated file.

As one of use cases of a captured image, a user may write back an image retrieved from a digital video camera to a personal computer to the digital video camera. Thereafter, the user may play back and edit the image on the digital video camera. This write-back process corresponds to a process performed by the personal computer in which a stream file stored in a local disk is copied to an HDD incorporated in the digital video camera serving as a mass storage device. Since the digital video camera during USB connection operates only as a mass storage device, such a write-back process is basically performed by an authoring engine or an application tool running on the personal computer.

In most digital video cameras including an HDD dedicated to SD image capturing, the captured image is recorded in the form of an MPEG2-PS file because the image is converted to a DVD-video. In such digital video cameras, when the MPEG2-PS file is copied into a predetermined folder in the HDD incorporated in the camera from a personal computer over a USB connection, the camera can directly play back the image data. That is, a write-back operation of an image file from a personal computer to a digital video camera can be easily performed. This is also because the folder structure or the directory structure of the HDD incorporated in the camera is relatively simplified.

On the other hand, recently, the AVCHD standard has been proposed as a video camera standard for recording a high definition (HD) image. The AVCHD employs the MPEG-4 AVC/H.264 codec having a relatively high compression ratio so that an HD image can be recorded on a low-capacity and low-speed medium. Currently, the AVCHD is used for recording an HD image on a DVD disk. However, an HD image in the AVCHD format can be recorded on a variety of media, such as a memory card and an HDD.

In the AVCHD format, an HD image is recorded in the form of an MPEG2-TS file. However, not only the stream file is stored on a medium but also a plurality of management information files used for playing back or editing the moving image file are stored together with the stream file. Thus, the AVCHD format has a complicated folder structure.

Accordingly, unlike the above-described digital video camera dedicated to SD image capturing, the digital video camera supporting the AVCHD format cannot play back a written-back stream file by simply copying the stream file into a predetermined folder. That is, to re-use a stream file written back from a personal computer, not only the stream file needs to be copied into the HDD incorporated in the digital video camera, but also the management information file associated with the stream file needs to be reconstructed in a storage area of the HDD so that the structure complies with the AVCHD format. That is, an appropriate additional copy operation is needed so that the stream file complies with the AVCHD format.

More specifically, to copy a stream file from a personal computer to a digital video camera including an HDD for capturing an HD image, the stream file needs to be additionally recorded in a predetermined folder so as to comply with the AVCHD format.

However, in general, an application or an authoring engine running on a personal computer is designed so as to perform authoring on a plurality of content files at the same time (i.e., performs authoring on the basis of a predetermined folder structure complying with the AVCHD format as a unit). Accordingly, in general, the application or the authoring engine is not suitable for a method in which a stream file is added to another stream file in the AVCHD format already recorded on an internal HDD.

In addition, when a management information file associated with a stream file additionally recorded on the internal HDD is generated, the stream needs to be temporarily separated (demuxed) into moving image data and audio data and, subsequently, the moving image data and audio data need to be reintegrated together (muxed) so as to acquire a variety of parameters forming the management information. At that time, a sufficient amount of free space is required on a local disk of a personal computer in order to create temporary files.

When a stream file is additionally recorded on the internal HDD of the digital video camera after the temporary files for the stream are created on the local disk of the personal computer, the following time-consuming processes are required: (1) generating the temporary file on the local disk, (2) transferring necessary files among the temporary files to the digital video camera via a USB cable, and (3) updating the management information file on the internal HDD of the digital video camera.

SUMMARY OF THE INVENTION

Accordingly, the present invention provides an excellent data processing system, an apparatus and a method for processing information, a recording and playback apparatus, and a computer program for storing, playing back, and transferring data collected from an externally connected data recording and playback apparatus, such as a digital camera, serving as a peripheral device.

Furthermore, the present invention provides an excellent data processing system, an apparatus and a method for processing information, a recording and playback apparatus, and a computer program for transferring data collected from an externally connected data recording and playback apparatus to the data recording and playback apparatus so that the data recording and playback apparatus can play back the data.

Still furthermore, the present invention provides an excellent data processing system, an apparatus and a method for processing information, a recording and playback apparatus, and a computer program for suitably transferring an HD image file in the AVCHD format to a data recording and playback apparatus that supports the AVCHD format so that the data recording and playback apparatus can play back the HD image file.

Yet still furthermore, the present invention provides an excellent data processing system, an apparatus and a method for processing information, a recording and playback apparatus, and a computer program for transferring content to a data recording and playback apparatus using a method for adding the content to other content already recorded in a data recording and playback apparatus in the AVCHD format so that the content can be played back by the data recording and playback apparatus.

Yet still furthermore, the present invention provides an excellent data processing system, an apparatus and a method for processing information, a recording and playback apparatus, and a computer program for efficiently transferring content to a data recording and playback apparatus in a short time using an existing authoring engine that performs an authoring process on a plurality of content items in the AVCHD format at the same time so that the content can be played back by the data recording and playback apparatus.

According to an embodiment of the present invention, a data processing system includes an information processing apparatus including controlling means and a recording and playback apparatus connected to the information processing apparatus via communicating means. The recording and playback apparatus includes first recording means and second recording means. The controlling means of the information processing apparatus transfers a first data stream file and a first management information file used for managing the first data stream file to the recording and playback apparatus. The first recording means records a second data stream file and a second management information file used for managing the second data stream file thereon using a predetermined directory structure. The second recording means records the first data stream file and the first management information file transferred from the information processing apparatus thereon using the predetermined directory structure. After the controlling means of the information processing apparatus transfers the first data stream file and the first management information file to the second recording means, the controlling means additionally records or updates the second data stream file and the second management information file that are recorded on the first recording means and that respectively correspond to the first data stream file and the first management information file recorded on the first recording means on the basis of the first data stream file and the first management information file.

According to the embodiment, the data processing system includes the recording and playback apparatus, such as a digital video camera, and the information processing apparatus, such as a personal computer. The two apparatuses are connected to each other via a USB cable or other communicating means. As used herein, the term "system" refers to a logical combination of a plurality of apparatuses (or function modules for providing a specific function); the plurality of apparatuses (or function modules) is not necessarily included in one body.

In recent years, with the increase in capacity and reduction in size and cost of hard disk drives (HDDs), the use of HDD digital video cameras has become widespread. In general, an image stream file is recorded in a hard disk using a file system, such as the FAT (file allocation table) system. In addition, the AVCHD standard has been proposed as a video camera standard for recording a high definition (HD) image. An image stream file can be recorded on a variety of media, such as a memory card or an HDD, in the AVCHD format.

On the other hand, a digital video camera may be connected to a personal computer via a USB cable. In such a case, a captured image file can be transferred from the digital video camera to the personal computer and can be subjected to a variety of data processing on the personal computer. In addition, a user may want to write back an image retrieved from the digital video camera to the digital video camera so as to reuse the image on the digital video camera.

In the AVCHD format, an HD image is recorded in the form of an MPEG2-TS file. However, not only the stream file is stored on a medium but also a plurality of management information files used for playing back or editing the moving image file are stored together with the stream file. Thus, the AVCHD format has a complicated folder structure. Accordingly, the digital video camera supporting the AVCHD format cannot play back a written-back stream file by simply copying the stream file into a predetermined folder.

To re-use a stream file written back from a personal computer, not only the stream file needs to be copied into the HDD built in the digital video camera, but also a management information file associated with the stream file needs to be reconstructed in a storage area of the built-in HDD so that the structure complies with the AVCHD format. That is, an appropriate additional copy operation is needed so that the stream file complies with the AVCHD format.

According to the embodiment of the present invention, a data processing system includes an information processing apparatus including controlling means and a recording and playback apparatus connected to the information processing apparatus via communicating means. The recording and playback apparatus includes first recording means and second recording means. The controlling means of the information processing apparatus transfers a first data stream file and a first management information file used for managing the first data stream file to the recording and playback apparatus. The first recording means records a second data stream file and a second management information file used for managing the second data stream file thereon using a predetermined directory structure. The second recording means records the first data stream file and the first management information file transferred from the information processing apparatus thereon using the predetermined directory structure. After the controlling means of the information processing apparatus transfers the first data stream file and the first management information file to the second recording means, the controlling means additionally records or updates the second data stream file and the second management information file that are recorded on the first recording means and that respectively correspond to the first data stream file and the first management information file recorded on the first recording means on the basis of the first data stream file and the first management information file. In this way, a data file is written back.

To perform such data stream file transfer, the predetermined directory structure includes a data stream file folder for storing a data stream file and a management information file folder for storing a management information file. The controlling means of the information processing apparatus transfers the first data stream file into the data stream file folder located in the second recording means. The controlling means creates the first management information file using the first data stream file stored in the data stream file folder, and stores the created first management information file in the management information file folder located in the second recording means. After the controlling means moves the data stream file stored in the data stream file folder located in the second recording means and the management information file stored in the management information file folder located in the second recording means to the corresponding folders located in the first recording means, the controlling means deletes the recorded information in the second recording means. Accordingly, by generating the second recording means serving as a temporary folder in the HDD in the recording and playback apparatus to which the stream file is written back, an amount of time required for the write-back operation can be advantageously reduced. In addition, a free space on the HDD of a personal computer serving as the information processing apparatus can be advantageously increased. Furthermore, the possibility of the occurrence of abnormal completion of processing due to an accidental disconnection of communication can be advantageously decreased.

In addition, after the data file and the management information file are moved from the second recording means to the corresponding folders in the first recording means, the second recording means serving as the temporary folder is deleted from the file space of the recording and playback apparatus so that a free space is increased.

To support a video camera standard, such as AVCHD, the recording and playback apparatus has a predetermined directory structure for storing a movie stream. The predetermined directory structure includes, immediately below a predetermined folder for storing a movie stream, a stream folder for storing each of movie stream files, an attribute information file folder for storing an attribute information file associated with each of the movie stream files, and a playlist folder for storing a playlist file including information associated with an order in which the movie stream files in the stream folder are played back, and at least one management information file including information used for controlling a playback operation of the movie stream files on the basis of the playlist file.

To transfer, that is, write back a data stream file from the information processing apparatus to the recording and playback apparatus, the controlling means of the information processing apparatus transfers each of the movie stream files to be transferred to the stream folder in the second recording means. Subsequently, the controlling means separates each of the movie stream files in the stream folder in the second recording means and re-integrating the separated movie stream files to obtain a parameter. The controlling means creates the attribute information file on the basis of the parameter and stores the created attribute information file in the attribute information file folder in the second recording means.

Subsequently, the controlling means creates a playlist file for the created attribute information file, stores the created playlist file in the playlist folder in the second recording means, and creates a management information file in the second recording means.

After performing the above-described processes, the controlling means moves the movie stream files, the attribute information files, and the playlist file stored in the second recording means into the corresponding folders in the first recording means, and edits the management information file in the second recording means of the predetermined directory structure according to AVCHD in order to add the playlist file to the management information file.

The controlling means of the information processing apparatus can store predetermined files included in the first management information file in a backup folder provided in the first recording means before additionally recording or updating the second data stream file and the second management information file. In this way, the management information file that is necessary for the playback operation of the data stream file can be preserved.

In addition, the controlling means of the information processing apparatus can update an index file and a movie object file included in the second management information file recorded in the first recording means after additionally recording the second data stream file and the second management information file.

The controlling means of the information processing apparatus can separate a movie stream file group to be transferred into at least one sub-group each having a size smaller than or equal to a predetermined size, and the controlling means can sequentially transfer the movie stream file to the second recording means, generate the attribute information file and the playlist file associated with the movie stream file, and edit the management information file for each of the sub-groups. By separating a movie stream file group to be transferred into sub-groups and processing the sub-groups, a large amount of processing time that is required for processing all the stream files in the temporary folder at one time can be reduced.

If the connection between the information processing apparatus and the recording and playback apparatus is disconnected while a data stream is transferred from the information processing apparatus to the recording and playback apparatus, that is, while the write-back operation is performed, or another failure happens during the write-back operation so that the process is stopped, the temporary folder may remain undeleted on the first recording means in the recording and playback apparatus. Such a temporary folder is only garbage in a storage space, and therefore, the garbage reduces the recording capacity of the recording and playback apparatus.

Accordingly, the information processing apparatus can delete data remaining undeleted on the second recording means, that is, the temporary folder. Additionally, if the recording and playback apparatus detects the presence of the temporary folder serving as the second recording means when the recording and playback apparatus is in a stand-alone state in which the recording and playback apparatus is not connected to the information processing apparatus, the recording and playback apparatus may autonomously delete the temporary folder.

According to another embodiment of the present invention, a computer-readable program is provided for causing a computer to transfer a first data stream file stored in an information processing apparatus to a recording and playback apparatus that records a second data stream file and a second management information file used for managing the second data stream file thereon using a predetermined directory structure. The program includes the steps of performing control so as to record the first data stream file and a first management information file used for managing the first data stream file in the recording and playback apparatus, and performing control so as to additionally record or update the second data stream file and the second management information file that are recorded in the recording and playback apparatus on the basis of the first data stream file and the first management information file recorded in the recording and playback apparatus.

The computer-readable program defines a computer-readable program that can realize a predetermined process performed on a computer. That is, by installing the computer-readable program in a computer, cooperative operations are performed on the computer so that the computer can operate in the same way as the information processing apparatus of the data processing system that writes back a data file to the recording and playback apparatus. Accordingly, the computer-readable program can provides an advantage that is the same as that of the information processing apparatus.

Accordingly, the embodiments of the present invention can provide an excellent data processing system, an apparatus and a method for processing information, a recording and playback apparatus, and a computer program for transferring content collected from an externally connected data recording and playback apparatus to the data recording and playback apparatus so that the data recording and playback apparatus can play back the content.

Furthermore, the embodiments of the present invention can provide an excellent data processing system, an apparatus and a method for processing information, a recording and playback apparatus, and a computer program for suitably transferring an HD image file in the AVCHD format to a data recording and playback apparatus that supports the AVCHD format so that the data recording and playback apparatus can play back the HD image file.

Still furthermore, the embodiments of the present invention can provide an excellent data processing system, an apparatus and a method for processing information, a recording and playback apparatus, and a computer program for transferring content to a data recording and playback apparatus using a method for adding the content to other content already recorded in a data recording and playback apparatus in the AVCHD format so that the content can be played back by the data recording and playback apparatus.

Yet still furthermore, the embodiments of the present invention can provide an excellent data processing system, an apparatus and a method for processing information, a recording and playback apparatus, and a computer program for efficiently transferring content to a data recording and playback apparatus in a short time using an existing authoring engine that performs an authoring process on a plurality of content items in the AVCHD format at the same time so that the content can be played back by the data recording and playback apparatus.

According to the embodiments of the present invention, the information processing apparatus can write back content to an HDD digital video camera that record content in the AVCHD format, that is, can perform AVCHD additional recording. When separating a stream file into sub-files and re-integrating the sub-files into the stream file during the write-back operation, the information processing apparatus creates a temporary file of the stream on a built-in HDD of the digital video camera. In this way, the information processing apparatus can decrease the amount of time required for the write-back operation and increase the free space of the local disk thereof. In addition, the possibility of the occurrence of an abnormal event, such as accidental pull-out of a USB cable, can be reduced.

Other objects, advantages and features of the present invention will become apparent from the following description of exemplary embodiments with reference to the attached drawings.

BRIEF DESCRIPTION OF THE DRAWINGS

FIG. 4 illustrates an exemplary data structure for recording user data in a recordable and editable format on an HDD of the digital video camera;

DESCRIPTION OF THE PREFERRED EMBODIMENTS

Exemplary embodiments of the present invention are described below with reference to the accompanying drawings.

Figure 1:
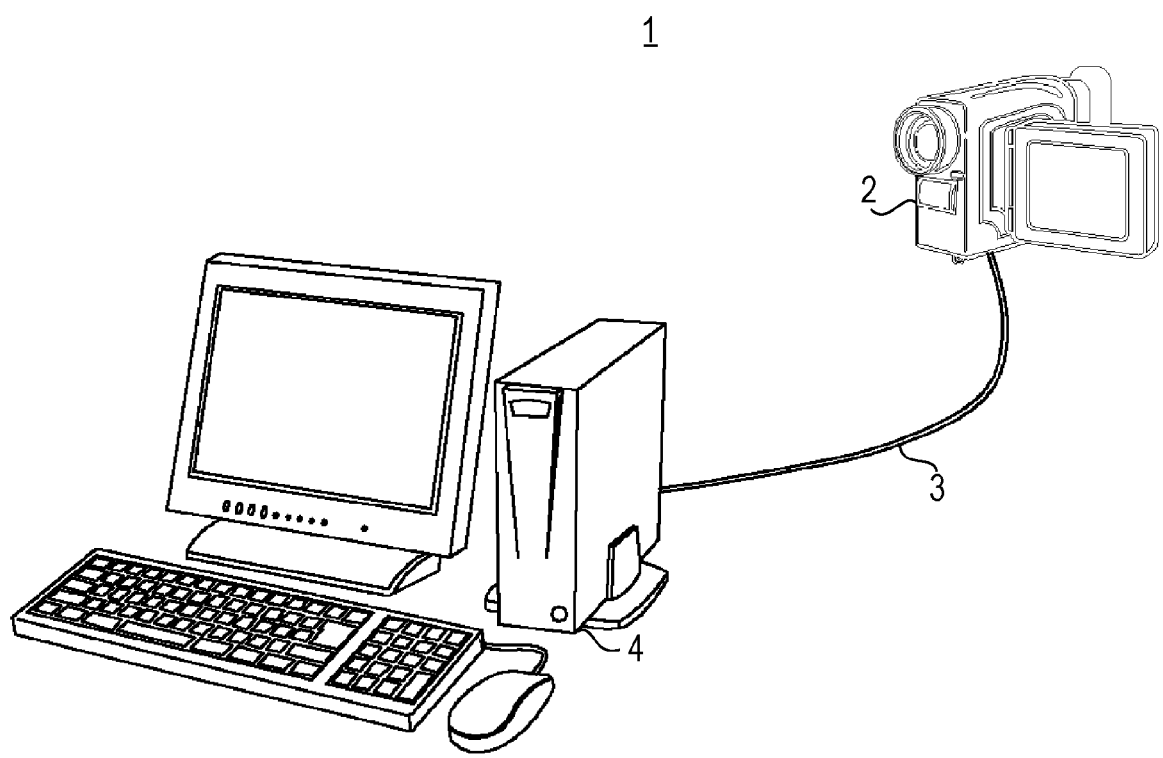
FIG. 1 is a diagram illustrating an exemplary configuration of a data processing system according to an embodiment of the present invention.

FIG. 1 illustrates an exemplary structure of a data processing system 1 according to an embodiment of the present invention. As shown in FIG. 1, the data processing system 1 includes a HDD digital video camera 2 and a personal computer 4 to which the HDD digital video camera 2 is externally connected via a USB cable 3.

According to the present embodiment, the HDD digital video camera 2 records an HD image in the form of an MPEG2-TS stream according to the AVCHD format. AVCHD is a video camera standard proposed by Sony Corporation. The AVCHD employs the MPEG-4 AVC/H.264 codec having a relatively high compression ratio so that an HD image can be recorded on a low-capacity and low-speed medium.

The personal computer 4 operates as a USB master. The digital video camera 2 that operates as a USB slave is connected to the personal computer 4 via a USB cable. For the personal computer 4, the USB-connected digital video camera 2 appears to be a mass storage device externally connected thereto. During USB connection, the digital video camera 2 only operates as a mass storage device. Accordingly, other functions, such as an image recording function and an image editing function, do not work.

Figure 2:
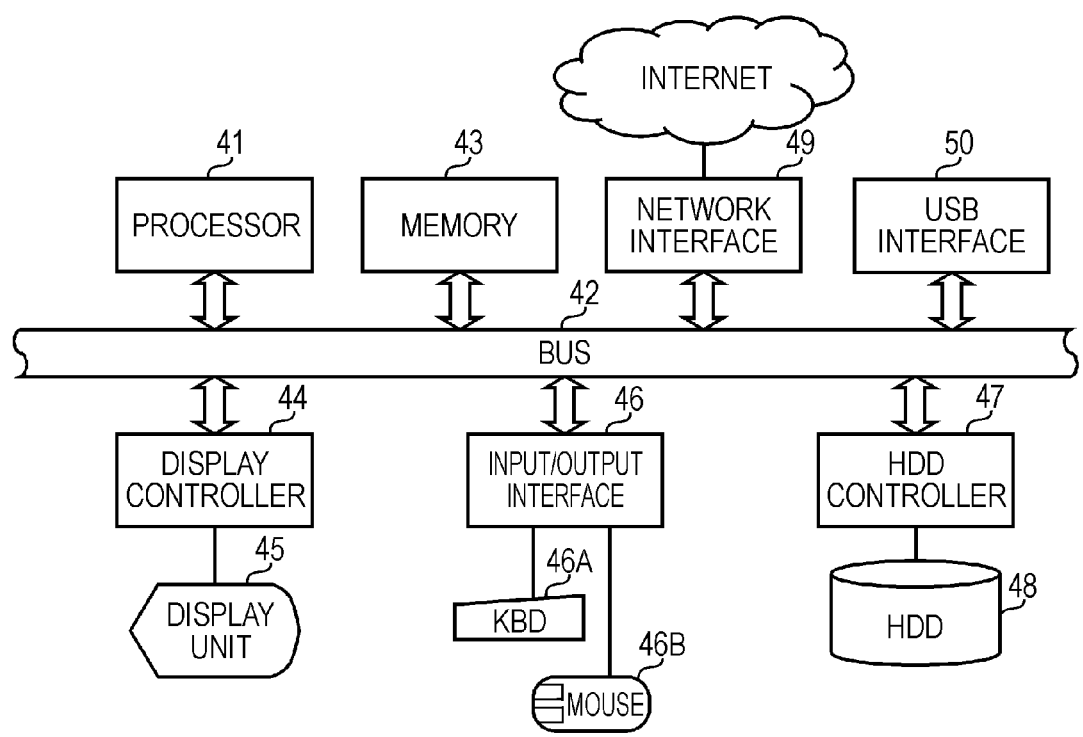
FIG. 2 is a diagram illustrating an exemplary internal configuration of a personal computer.

FIG. 2 illustrates an exemplary internal configuration of the personal computer 4. The main component of the personal computer 4 is a processor 41. The processor 41 performs a variety of processes in accordance with programs stored in a memory in a program execution environment provided by an operating system (OS). The OS supports a bitmap display format and provides a GUI (graphic user interface) operating environment.

The processor 41 controls a variety of peripheral devices connected thereto via a bus 42. Examples of the peripheral devices connected to the bus 42 include the followings.

A memory 43 is a semiconductor memory, such as a dynamic RAM (DRAM). Program code executed by the processor 41 is loaded into the memory 43, and environment variables and system variables used during program execution are temporarily stored in the memory 43. The memory 43 forms a memory space of the processor 41.

A display controller 44 generates an image to be displayed in response to a drawing instruction sent from the processor 41. Thereafter, the display controller 44 sends the generated image to a display unit 45, which is connected to the display controller 44. The display unit 45 displays the image on a screen in accordance with display image information sent from the display controller 44.

A keyboard 46A and a mouse 46B are connected to an input/output interface 46. The input/output interface 46 receives a user input signal sent from the keyboard 46A and the mouse 46B and sends the user input signal to the processor 41.

A network interface 49 is connected to external networks, such as a local area network (LAN) and the Internet. The network interface 49 controls data communication over the Internet. That is, the network interface 49 receives data sent from the processor 41 and sends the data to another device in the Internet. In addition, the network interface 49 receives data sent via the Internet and delivers the data to the processor 41. For example, the network interface 49 can receive a program or data sent from the outside via the network.

An HDD controller 47 controls input and output of data from and to an HDD 48 operating as a local disk. The HDD 48 stores an OS, an application program, and a driver program to be executed by the processor 41, and further stores data and content referenced and played back using the programs. According to the present embodiment, the programs are installed in the HDD 48 so as to be converted to an executable format.

A USB interface 50 allows a mass storage device, such as an external USB hard disk or a USB memory, and a USB device, such as a printer, a scanner, or a modem, to be externally connected to the personal computer 4 operating as a USB master. Thus, the USB interface 50 establishes an interface protocol between the bus 42 and the USB. As mentioned earlier, the HDD digital video camera 2 can be connected to the USB interface 50 via the USB cable 3 so as to operate as a USB slave, that is, a mass storage device.

To form the personal computer 4, a large number of electric circuits are needed in addition to the components shown in FIG. 2. However, these electric circuits are well known to those skilled in the art. In addition, the electric circuits are not key components of the present embodiment. Accordingly, descriptions thereof are not provided here. Furthermore, for simplicity, all the connections between hardware blocks shown in FIG. 2 are not shown.

Figure 3:
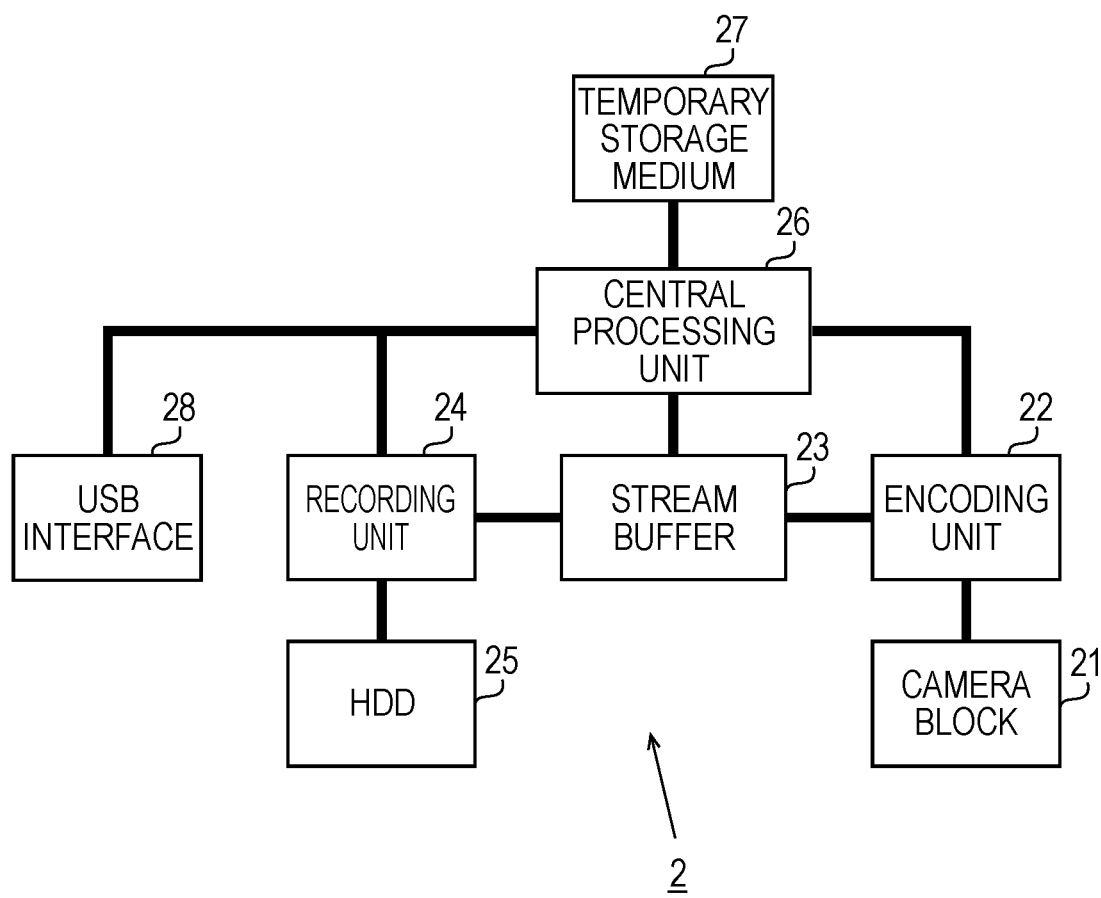
FIG. 3 is a block diagram of an exemplary internal configuration of a digital video camera.
Figure 5A:
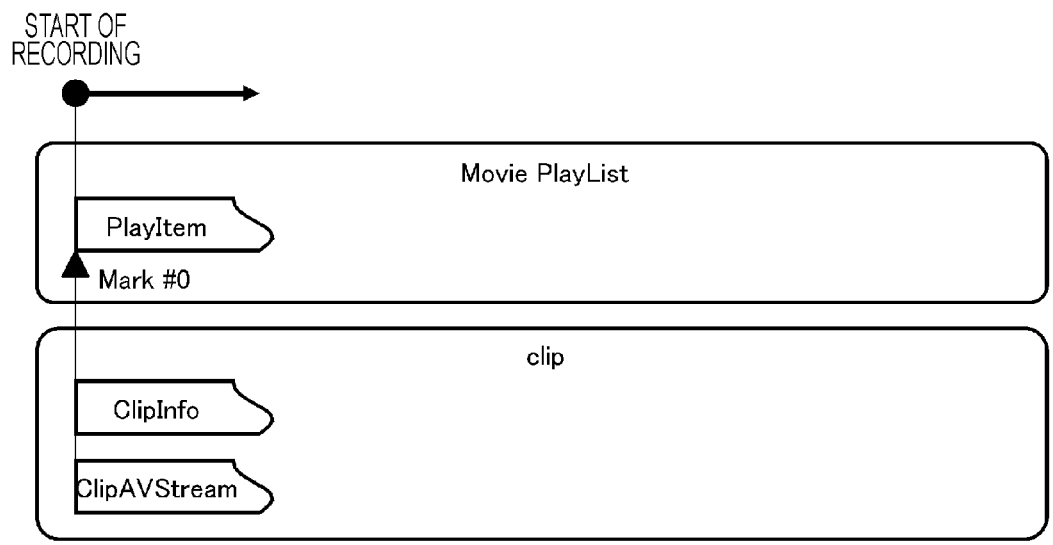
FIG. 5A illustrates a procedure for generating a clip of an AV stream and a playlist in accordance with recording an image captured by the digital video camera.
Figure 5B:
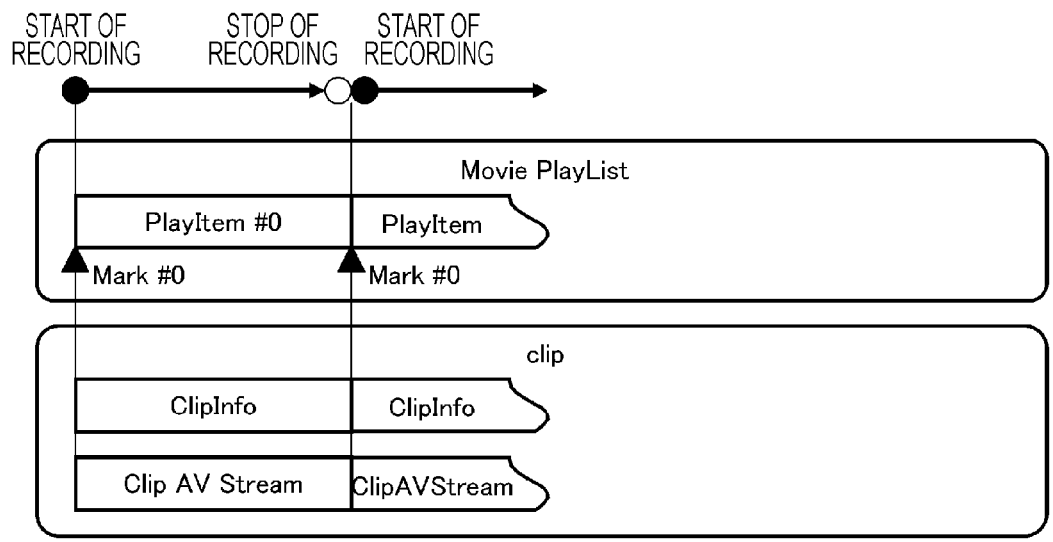
FIG. 5B illustrates a procedure for generating a clip of an AV stream and a playlist in accordance with recording an image captured by the digital video camera.
Figure 5C:
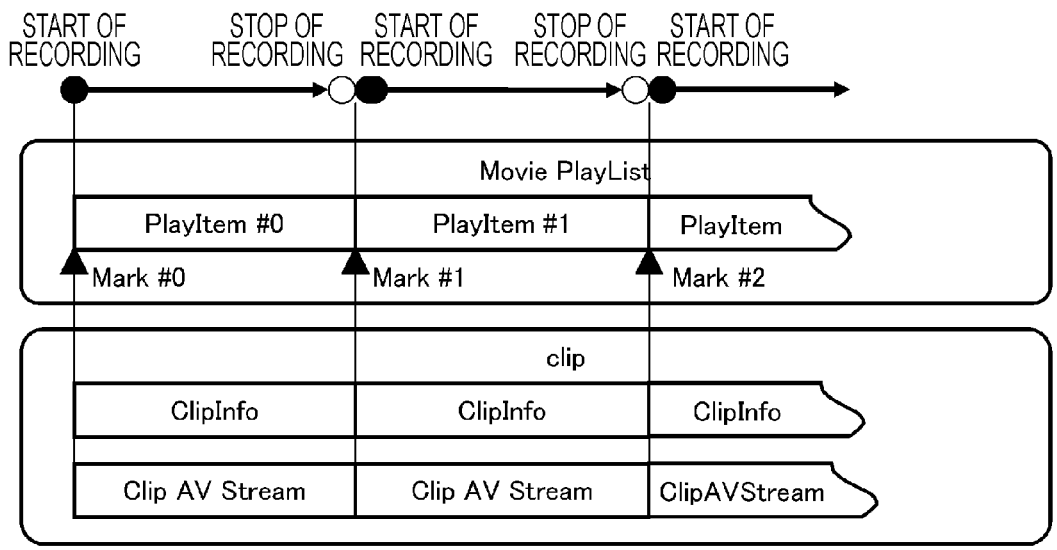
FIG. 5C illustrates a procedure for generating a clip of an AV stream and a playlist in accordance with recording an image captured by the digital video camera.
Figure 5D:
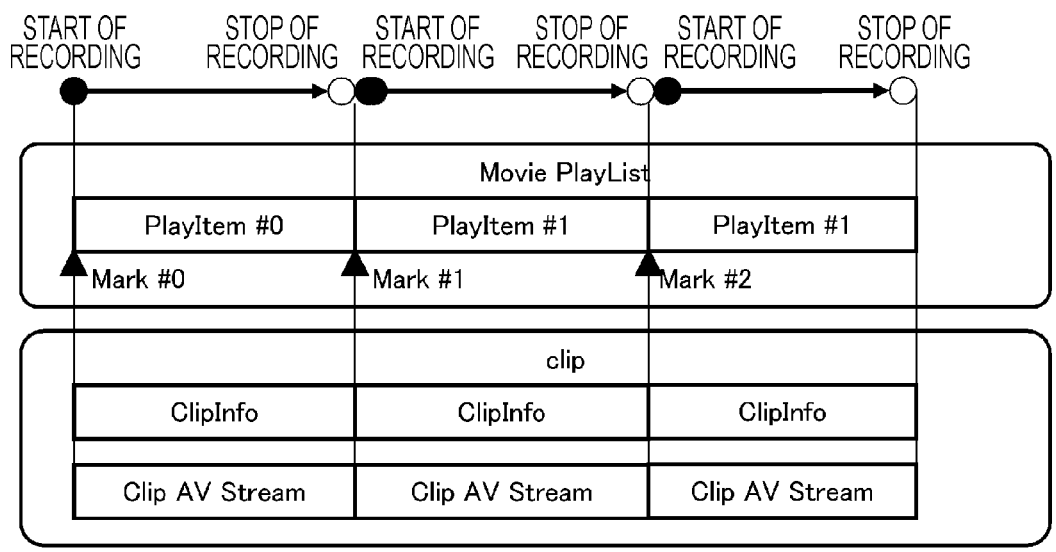
FIG. 5D illustrates a procedure for generating a clip of an AV stream and a playlist in accordance with recording an image captured by the digital video camera.

FIG. 3 is a schematic illustration of an exemplary internal configuration of the digital video camera 2. The digital video camera 2 shown in FIG. 3 supports the AVCHD format. A video stream captured by a camera block 21 is encoded into an MPEG2-TS stream by an encoding unit 22. A recording unit 24 records the MPEG2-TS stream on an HDD 25 serving as a recording medium incorporated in the digital video camera 2. When a USB interface 28 of the digital video camera 2 is connected to a USB master via the USB cable 3, the digital video camera 2 operates as a USB slave, that is, a mass storage device externally connected to the USB master.

A central processing unit 26 loads an execution program onto a temporary storage medium 27 formed from, for example, a random access memory (RAM) and temporarily stores system variables and environment variables in the temporary storage medium 27. Subsequently, the central processing unit 26 executes the program so as to perform overall control of the operations of the digital video camera 2. Examples of the operations include capturing a moving image by the camera block 21, camera operations, such as an auto focus function, an auto exposure function, image stabilization, and an auto shutter function, performed during capture of the moving image, recording a video stream on the HDD 25 using the recording unit 24, an edit operation of a stream recorded on the HDD 25, and the operation of a USB slave, that is, a mass storage device (in the case of USB connection).

The camera block 21 includes a solid-state image sensing device, such as a charge coupled device (CCD) or a complementary metal-oxide semiconductor (CMOS) device, for performing photoelectrical conversion in accordance with the intensity of input light so as to generate an electrical image signal, an analog-to-digital (A/D) converter for converting the image signal to a digital format, and a demosaic processing unit (not shown) for computing an RGB signal from the digital image signal.

The encoding unit 22 encodes a video stream using the MPEG2-TS method and outputs an AV stream including fixed byte-length TS packets. The TS packet is temporarily stored in a stream buffer 23 and, subsequently, is transferred to the recording unit 24. Upon receiving TS packet data via the stream buffer 23 at predetermined intervals, the recording unit 24 records the TS packet data in a storage area of the HDD 25.

The recording unit 24 records the AV stream and user data. In addition, the recording unit 24 can record a video stream in a format complying with the AVCHD standard so as to realize a recording and editing function.

AVCHD is a video camera standard that allows an HD image to be recorded on a low-capacity and low-speed medium. The AVCHD appropriately has compatibility with an existing disk format standard. In addition, recording compatibility and write-once compatibility are newly added to the AVCHD so that a data format standard for HD video cameras is provided. More specifically, when video content captured by a video camera is encoded into an MPEG2-TS stream and is recorded and a clip AV stream (a ClipAVStream file) serving as content data is recorded, separate files, that is, a playlist (a PLayList file) and clip information (a ClipInformation file) are used. Thus, an excellent recording and editing function can be achieved.

A data unit that needs to be played back in a continuous synchronous playback mode, that is, in a real-time playback mode forms a clip. The clip is recorded as a video file. A clip AV stream file stores a stream in the MPEG2-TS format. A clip information file is created so as to correspond to a clip AV stream file. The clip information file includes information needed for actually playing back the stream. The playlist includes a playback start point (an IN point) and a playback end point (an OUT point) of at least one clip so as to indicate a playback period and a playback order of the video data.

FIG. 4 illustrates an exemplary logical data structure of user data used when recording the user data on the HDD 25 in a recordable and editable format and in the AVCHD format. As shown in FIG. 4, to encode video data captured by the digital video camera 2 into an MPEG2-TS stream and record the MPEG2-TS stream, the following types of file are used: an index file (index), a movie object file (MovieObject), a playlist file (PlayList), a clip information file (ClipInformation), and a clip AV stream file (ClipAVStream).

TABLE 1

| Type of File | Maximum Number | Function |
|---|---|---|
| Index | 1 | Main file for managing an entire medium. This file manages a correspondence between a title presented to a user and MovieObject. In AVCHD format, an order in which titles are played back is managed in meta data of index file (note that the order is managed in MovieObject file in existing formats) |
| MovieObject | 1 | File for managing a playlist containing titles played back when a title is selected. |

TABLE 1-continued

| Type of File | Maximum Number | Function |
| --- | --- | --- |
| Real PlayList | total 2000 | Playback list for original title. Recorded and played-back images are registered in an order in which the images are recorded. |
| Virtual PlayList | | Playback list used for generating a user-defined playlist in a nondestructive editing mode. This list does not have Clip dedicated to the virtual playlist. This list points a clip registered in any one of Real PlayLists so as to play back the clip. |
| Clip Information | 4000 | This file corresponds to Clip AV Stream file and contains information needed for playing back an actual stream. |
| Clip AV Stream | 4000 | This file stores a stream recorded in MPEG2-TS format. Image data of AVC is stored in this file. |

The entire storage area of the HDD 25 is managed using a file type layer of the index. An index file is created for each of titles presented to a user. The index file manages a correspondence between a title and a movie object. As used herein, the term "title" refers to a set of PlayLists that a user can recognize. In general, the title corresponds to a program or date-based content. In the AVCHD format, an order in which titles are played back is managed in meta data of the index file (note that the order is managed in MovieObject file in existing formats). When a recording medium is mounted in a player, the index is read out first. Thus, the user can view titles written in the index.

A movie object is a set of commands for controlling playback. For example, in an existing ROM-standard format, the movie object is a file for managing a playlist played back when a title is selected. References to movie objects are listed in an index as entry points of the titles. However, in the AVCHD format, a movie object file is not referenced. A correspondence between a playlist and a title is managed using meta data of the index file.

A playlist is provided so as to correspond to a title that is presented to the user. The playlist includes one or more play items "PlayItem". Each play item includes a playback start point (an IN point) and a playback stop point (an OUT point) of a clip so that the playback period of the clip is determined. By arranging a plurality of the play items on a time axis in the playlist, an order in which the playback periods of the play items are played back can be determined. In addition, play items referencing different clips can be included in one playlist.

A reference relationship between a clip and a playlist can be freely determined. For example, a reference to one clip can be made from two playlists including different IN points and OUT points. Furthermore, a reference relationship between a title and a movie object can be freely determined. The playlist falls in two categories: a real playlist "Real PlayList" and a virtual playlist "Virtual PlayList".

The real playlist is a playlist for an original title. The real playlist records play items for video streams captured and recorded by a video camera in an order in which the video streams are recorded.

The virtual playlist is a playlist for generating a user-defined playlist in a nondestructive editing mode. The virtual playlist does not have a clip (an AV stream) dedicated to the virtual playlist. A play item in the virtual playlist points a clip registered in any one of the real Play lists or part of the clip. That is, the user cuts only desired playback periods from a plurality of clips and puts the play items indicating these periods together. In this way, the user can edit the virtual playlist.

A clip is a file including moving image data recorded as a chunk of data representing a data unit that can be continuously and synchronously played back, that is, that can be played back in real time. The clip includes a clip AV stream file "Clip AV Stream" and a clip information file "Clip Information".

The clip AV stream represents content data. The clip AV stream is a file in the HDD 25. The clip AV stream includes a stream in the MPEG2-TS format. In the AVCHD format, a video stream is stored in this file.

The clip information file is created so as to correspond to a clip AV stream file. The clip information file contains the attributes of a stream required for playing back the stream. More specifically, the clip information file contains information for indicating an encoding method of a stream, the size of the stream, a method for converting a playback time period to the addresses, playback management information, and a time map (in the case of a DVD recording medium).

The procedure for generating a clip of an AV stream and a playlist in accordance with an image capturing operation of the digital video camera 2 is described next with reference to FIGS. 5A to 5D.

Every time a user starts recording an image and stops the recording, a play item is generated for that image capturing period. In addition, a clip AV stream file is created for the recorded segment of the captured stream. At the same time, a clip information file is created. Here, a clip represents a data unit that can be played back continuously and synchronously, that is, in real time.

Furthermore, every time the user starts recording an image, a "Mark" serving as an entry mark is attached to the top of the play item. The entry mark in the playlist is also referred to as a "playlist mark (PLM)". The Mark is used in a playlist to indicate a temporal position of playback content. In one playlist, sequential sequence numbers are assigned to the play items. Similarly, sequential sequence numbers are assigned to the playlist marks. A playlist mark needs to be always attached to the top of a movie playlist (MoviePlayList). However, the position of the playlist mark can be moved on the time axis through a predetermined edit operation.

The entry mark indicates the entry position of a stream when a user accesses the stream. Accordingly, a period between neighboring entry marks (or the period starting from the last playlist mark to the end of the last play item) serves as a minimum edit unit for the user (i.e., a chapter). The order in which the playlists are played back is defined by arranging the play items in the order in which the play items are played back and arranging the entry marks in the order in which the entry marks are played back. In commercial products, a plurality of actual playlists are put together to form a series of chapters or a chapter group. The product is provided to users in this form.

Figure 6:
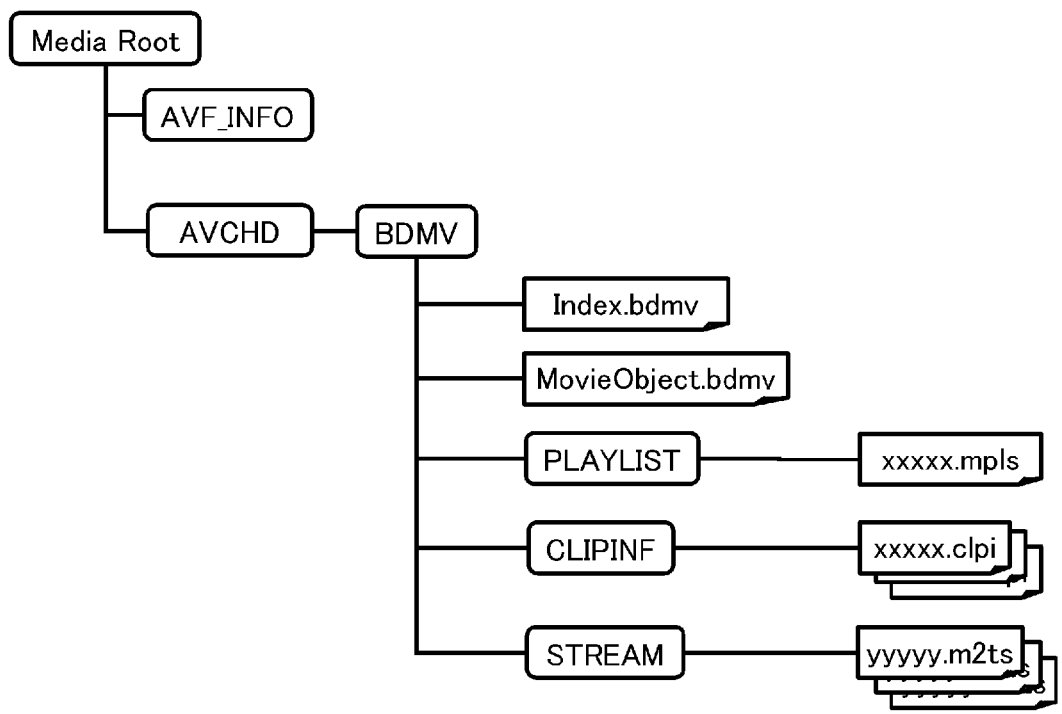
FIG. 6 illustrates a directory structure defined by AVCHD standard.

FIG. 6 illustrates a directory structure defined by the AVCHD standard. "PLAYLIST", "CLIPINF", and "STREAM" provided immediately below the BDM directory represent sub directories for storing a playlist, a clip information file, and a clip AV stream file, respectively.

As one of the use cases of a captured image, an image retrieved from the digital video camera 2 into the personal computer 4 is written back to the digital video camera 2 to carry the image. Thereafter, the image is played back and edited on the digital video camera 2. The write-back operation corresponds to an operation performed by the personal computer 4 in which a stream file stored in the local disk is copied to the HDD 25 of the digital video camera 2 serving as a mass storage device. Since the digital video camera 2 during USB connection functions only as a mass storage device, such a write-back operation is generally performed by an authoring engine or an application tool.

In the AVCHD format, an HD image is recorded as an MPEG2-TS file. As shown in FIG. 6, since a clip AV stream file includes a plurality of management information pieces, the structure of a clip AV stream file is complicated. Accordingly, in order to play back a clip AV stream file written back from the personal computer 4 to the digital video camera 2, the index file, the movie object file, the playlist file, and the clip information file need to be reconstructed in a storage area of the HDD 25 and needs to be converted so that the whole folder structure complies with the AVCHD standard. More specifically, when a stream file is copied from the personal computer 4 to the digital video camera 2, an additional stream file needs to be recorded in the folder structure shown in FIG. 6 while following AVCHD format. Furthermore, a data structure shown in FIG. 4 needs to be reconstructed.

As mentioned earlier, the digital video camera 2 during USB connection functions only as a mass storage device. Accordingly, in general, the write-back operation is performed by an authoring engine or an application tool running on the personal computer 4. However, in general, existing authoring engines are designed so as to perform authoring on a plurality of content files at the same time, that is, so as to perform authoring while considering the folder structure shown in FIG. 6 as one processed unit. Therefore, when the internal HDD 25 of the digital video camera 2 already contains other stream data in the folder structure shown in FIG. 6, the design of the authoring engine is not suitable for additionally writing the written-back stream file into the existing folder structure.

In addition, when the management information file associated with a stream file additionally written to the internal HDD 25 is generated, the stream needs to be temporarily separated (demuxed) into video data and audio data, and the video data and the audio data are reintegrated (muxed) in order to acquire a variety of parameters of the management information. At that time, temporary files used for separating and reintegrating the stream are generated.

If the temporary files for the stream are generated on the local HDD 48 of the personal computer 4 and, subsequently, a stream file is additionally recorded on the internal HDD 25 of the digital video camera 2, the following time-consuming processes are needed: (1) generating the temporary files on the local HDD 48 of the personal computer 4, (2) transferring necessary files among the temporary files from the personal computer 4 to the digital video camera 2 via the USB cable 3, and (3) updating the management information file on the internal HDD 25 of the digital video camera 2.

Therefore, according to the present embodiment, a stream file is written back in the following procedure: (1) generating temporary files on the HDD 25 in the digital video camera 2, (2) moving necessary files among the temporary files into a predetermined existing directory of AVCHD format on the HDD 25, and (3) updating the management information file associated with the stream file on the HDD 25 (i.e., an external mass storage device of the personal computer 4).

Figure 7:
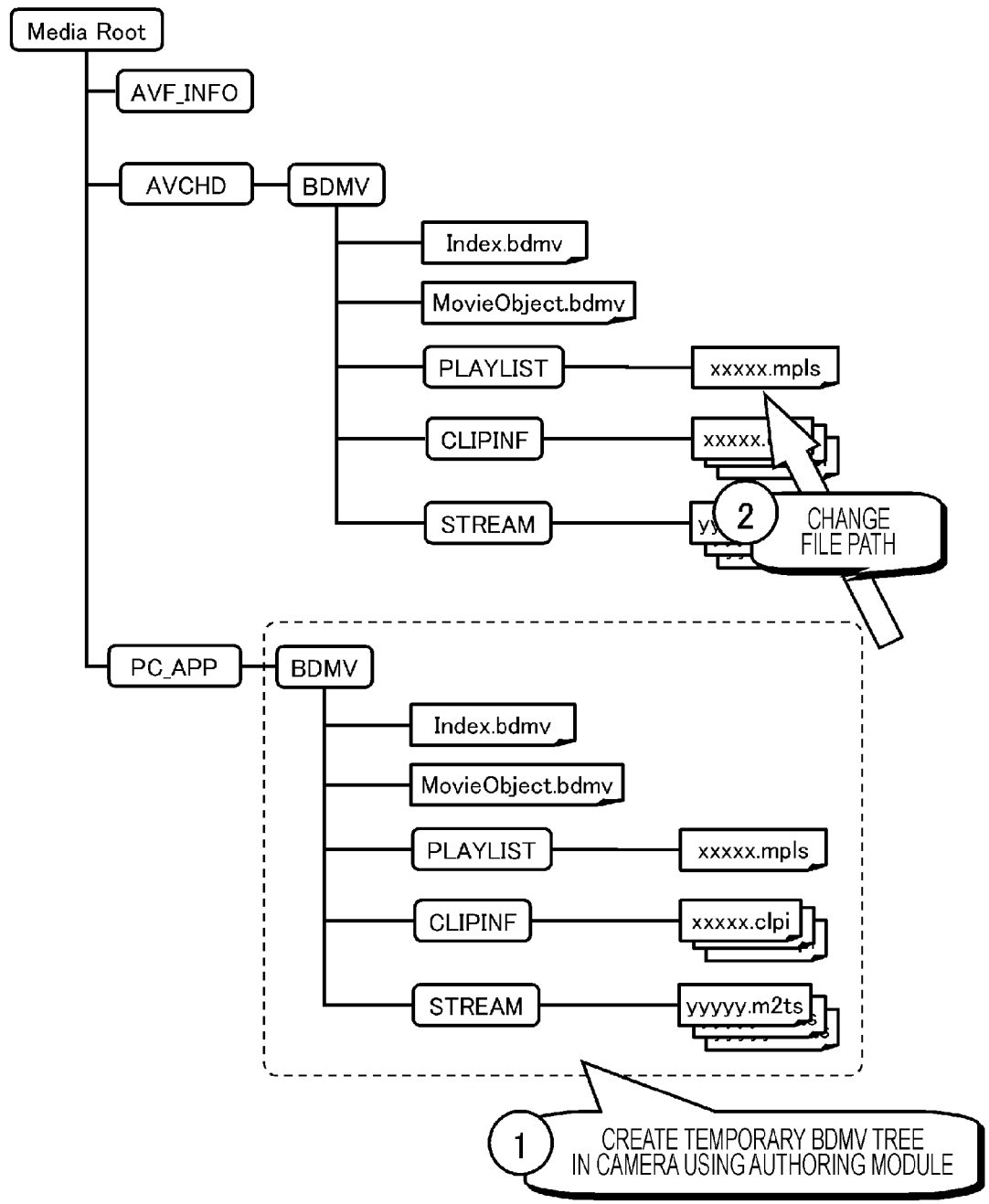
FIG. 7 illustrates an operation in which temporary files are created on the HDD of the digital video camera and, subsequently, necessary files among the temporary files are moved into appropriate folders on the HDD.

FIG. 7 illustrates an operation in which a temporary folder PC_APP is created on the HDD 25 in the digital video camera 2 and, subsequently, necessary files among the files in the temporary folder are moved into an appropriate folder on the HDD 25.

An authoring module (a transfer program) running on the personal computer 4 creates a BDMV tree that complies with the AVCHD format below the temporary file PC_APP on the HDD 25 serving as an external mass storage device. Subsequently, the authoring module creates a copy of a clip AV stream file to be transferred. In addition, the authoring module creates a clip information file and a playlist file associated with the clip AV stream file. Furthermore, for convenience of operation, the authoring module creates an index file (Index-.bdmv) and a movie object file (MovieObject.bdmv) immediately below PC_APP¥BDMV.

Subsequently, the clip AV stream file to be transferred, and the clip information file and the playlist file corresponding to the clip AV stream file stored in the temporary folder PC_APP¥BDMV are moved into the folders STREAM, CLIPINF, and PLAYLIST in the AVCHD¥BDMV folder, respectively. The folders STREAM, CLIPINF, and PLAYLIST are folders originally intended for storing these files. In addition, a newly created playlist file is added to the index file Index.bdmv and the movie object file MovieObject.bdmv in the folder AVCHD¥BDMV.

The second half of the above-described transfer process, in which the temporary files is transferred to the original folders, is achieved simply by changing the file paths. Therefore, the second half of the transfer process is completed in a short time. Accordingly, the content can be efficiently copied (written back) in a short time using the existing AVCHD authoring engine function of authoring a plurality of contents (i.e., creation of a BDMV tree) at the same time. Since the contents are written back in a format that complies with the AVCHD standard, the written-back contents can be played back on the digital video camera 2.

The procedure of transferring content (a stream file) from the personal computer 4 to the HDD 25 in the digital video camera 2 is described in detail below. The transfer procedure includes the following five phases.

Phase 1

A temporary folder PC_APP used for creating temporary files is created on the HDD 25 in the digital video camera 2. Thereafter, a BDMV tree similar to that of the AVCHD is created in the temporary folder. That is, temporary files for a playlist file, a clip information file, and a stream file are created and are stored in the folders PLAYLIST, CLIPINF, and STREAM in the PC_APP¥BDMV folder, respectively.

Figure 8:
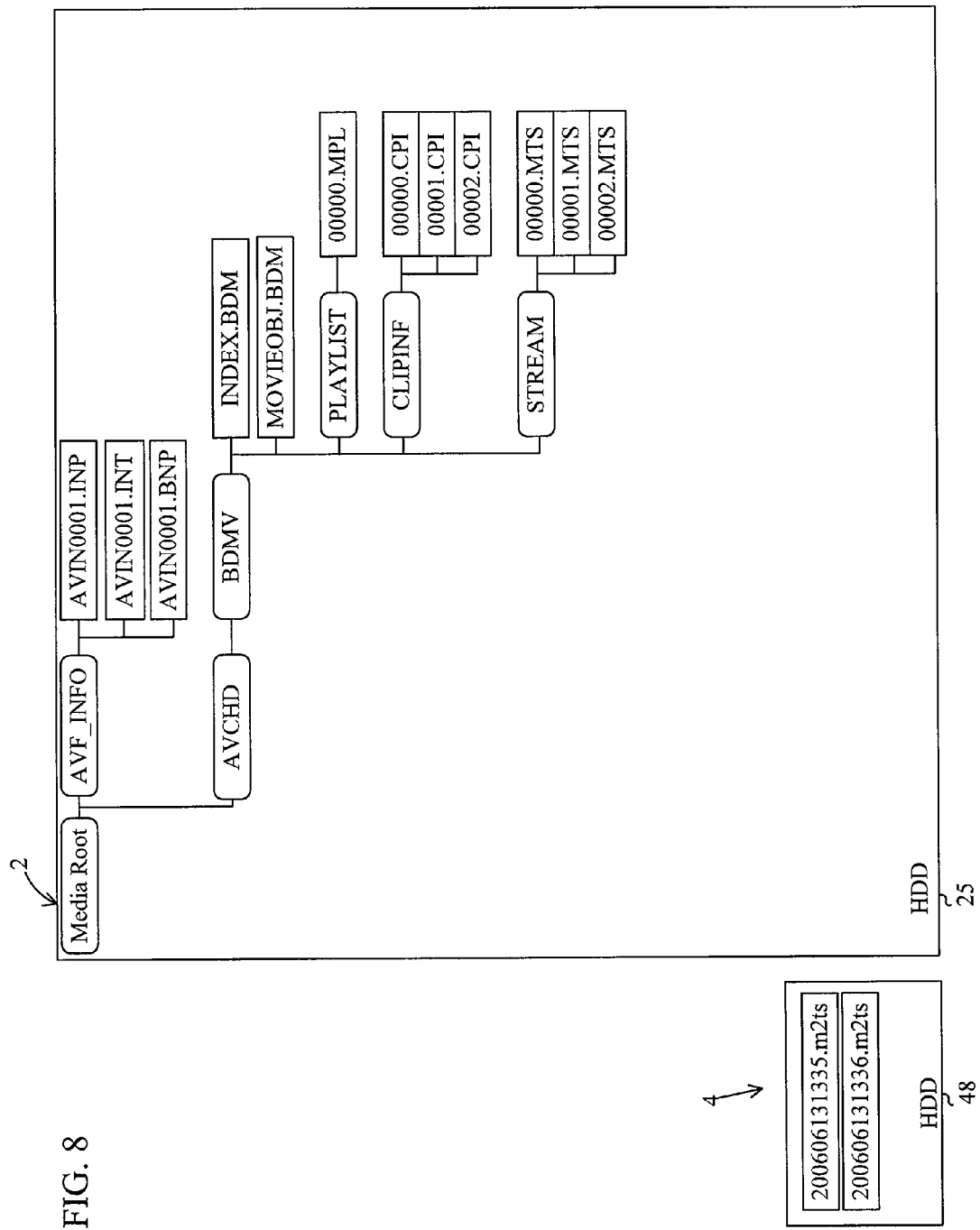
FIG. 8 illustrates a procedure for transferring content from the personal computer to the HDD in the digital video camera.
Figure 9:
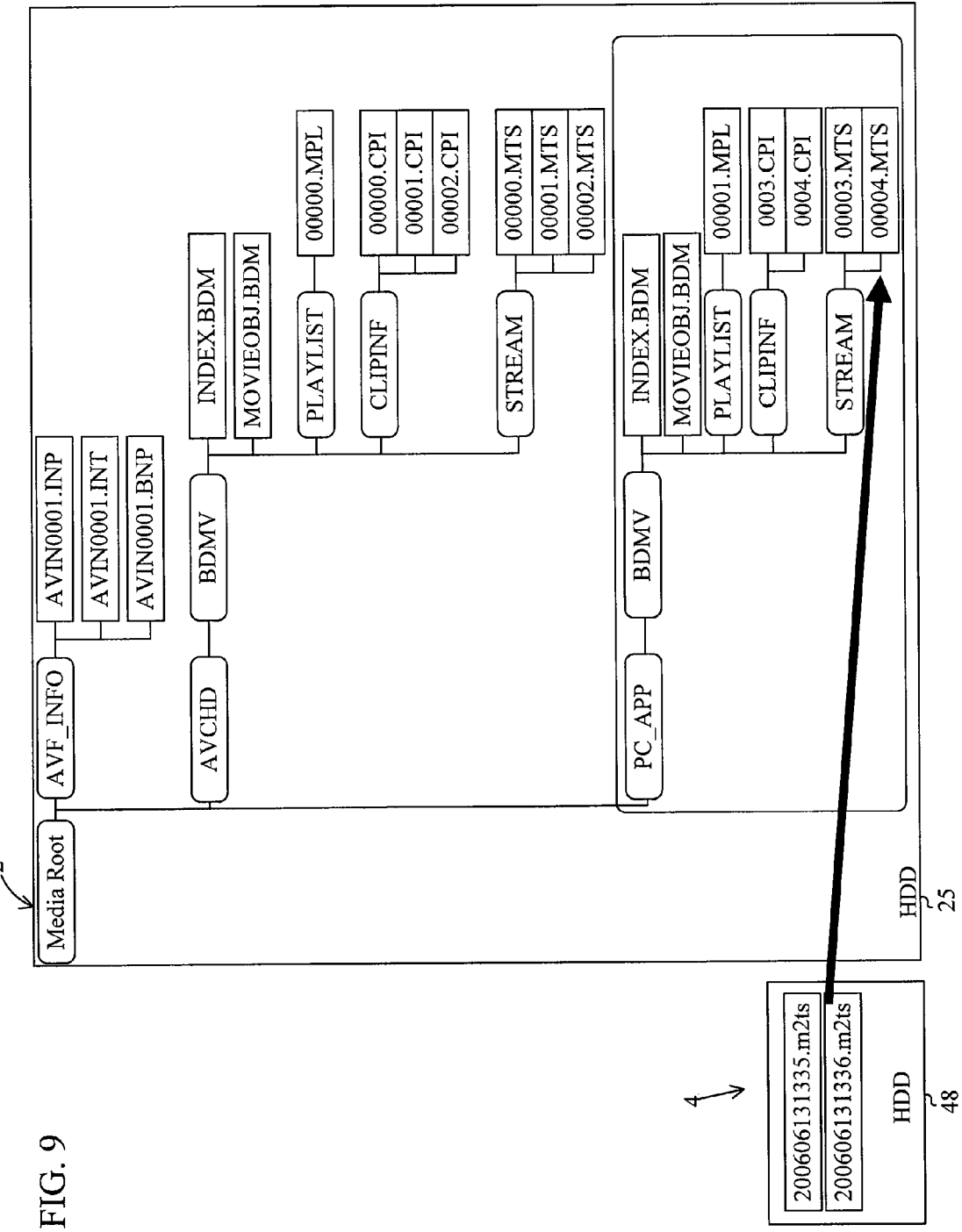
FIG. 9 illustrates a procedure for transferring content from the personal computer to the HDD in the digital video camera.

In this example, as shown in FIG. 8, two stream files in the local disk of the personal computer 4 are written back under a condition that files necessary for the AVCHD format are stored in the internal HDD 25 of the digital video camera 2. FIG. 9 illustrates the phase-1 process performed in a storage area of the HDD 25 in the digital video camera 2. A temporary file PC_APP is created immediately below the root folder of the HDD 25 first. Subsequently, the BDMV tree including the "PC_APP¥BMMV" folder that contains the streams to be written back is subjected to an authoring process.

Most of the time required for writing back the stream files is consumed in this phase. More specifically, when the 2.8-GHz Pentium (trade mark) IV available from Intel corporation is used for the processor 41 of the personal computer 4 and a 512-Mbyte main memory are used, a time required for creating the above-described temporary files for a 50-minute HD moving image (4.3-Gbyte file) is about 35 minutes.

In the example shown in the drawing, when the MPEG2-TS stream file is copied from the personal computer 4 to the digital video camera 2, the file extension is changed from "m2ts" to "mts". This is only because the "file name: extension name" formats are different in the personal computer 4 and the digital video camera 2, and therefore, this is not a key point of the present embodiment.

Phase 2

Backup files of the index file and the movie object file in the BDMV folder are created. Subsequently, the temporary files created in the temporary folder PC_APP¥BDMV, such as the movie playlist file, the clip information file, and the clip AV stream file, are moved into the corresponding folders in the folder AVCHD¥BDMV. The primary process in this phase is changing the file paths, and therefore, this phase can be accomplished in a significantly short amount of time.

Figure 10:
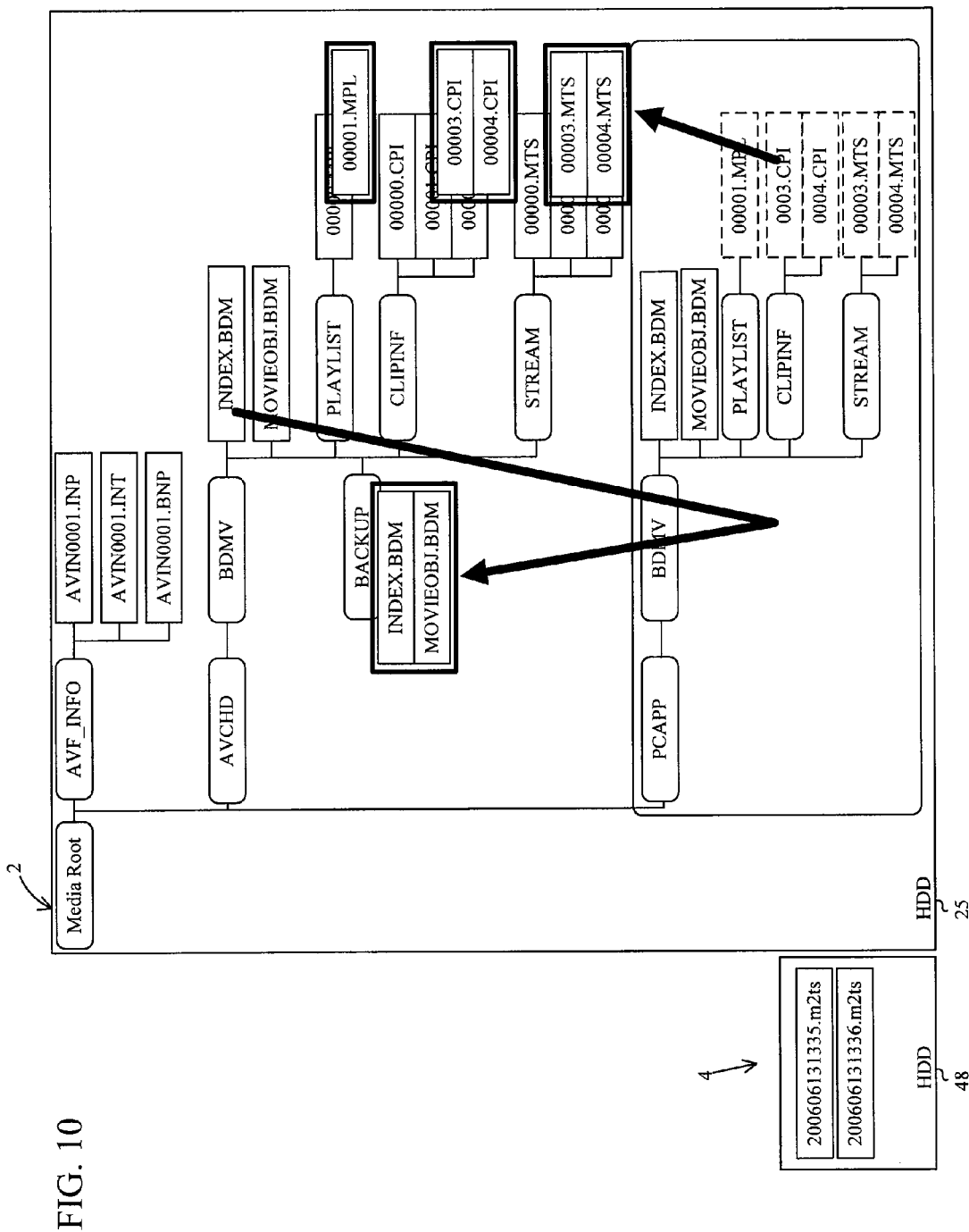
FIG. 10 illustrates a procedure for transferring content from the personal computer to the HDD in the digital video camera.

FIG. 10 illustrates the process of this phase performed in a storage area of the HDD 25 in the digital video camera 2.

The index file INDEX.BDMV and the movie object file MOVIEOBJ.BDMV in the temporary folder are updated. The temporary file of the index file and the movie object file is created by using merged information of the corresponding original files in the folder AVCHD¥BDMV.

Subsequently, a long-to-short conversion is performed on the file names of files in PC_APP¥BDMV folder so that the size of the file extension is changed from four characters to three characters.

Thereafter, the index file INDEX.BDM and the movie object file MOVIEOBJ.BDM in the folder AVCHD¥BDMV are copied into the temporary folder PC_APP.

Subsequently, a folder BACKUP used for backing up the original index file and movie object file is created in the folder AVCHD¥BDMV. The index file and the movie object file copied into the folder PC_APP are then moved into the folder BACKUP. The reason why the backup process is performed is because the index file contains data important for managing the entire storage area of the HDD 25. According to the present invention, any type of backup process can be employed.

Thereafter, all of the clip AV stream files (all the files having a file extension ".MTS") in the folder PC_APP¥BDMV¥STREAM are moved into the folder AVCHD¥BDMV¥STREAM.

Subsequently, all of the clip information files (all the files having a file extension ".CPI") in the folder PC_APP¥BDMV¥CLIPINF are moved into the folder AVCHD¥BDMV¥CLIPINF.

Subsequently, all of the movie playlist files (all the files having a file extension ".MPL") in the folder PC_APP¥BDMV¥PLAYLIST are moved into the folder AVCHD¥BDMV¥PLAYLIST.

Phase 3

The index file and the movie object file in the folder AVCHD¥BDMV are updated. The index file is a master file for managing the entire storage area of the HDD 25. The index file includes information about a correspondence between a set of the play lists serving as a title represented to the user and the movie object files managed. In addition, the meta data of the index file includes the order in which the playlists are played back. The movie object file includes a set of commands for controlling the playback of the streams so as to manage the playlists played back when the title is selected.

The process in this phase is accomplished in a significantly short amount of time, since the index file and the movie object file are copied into the temporary folder PC_APP, are updated, and are written back onto the files.

Figure 11:
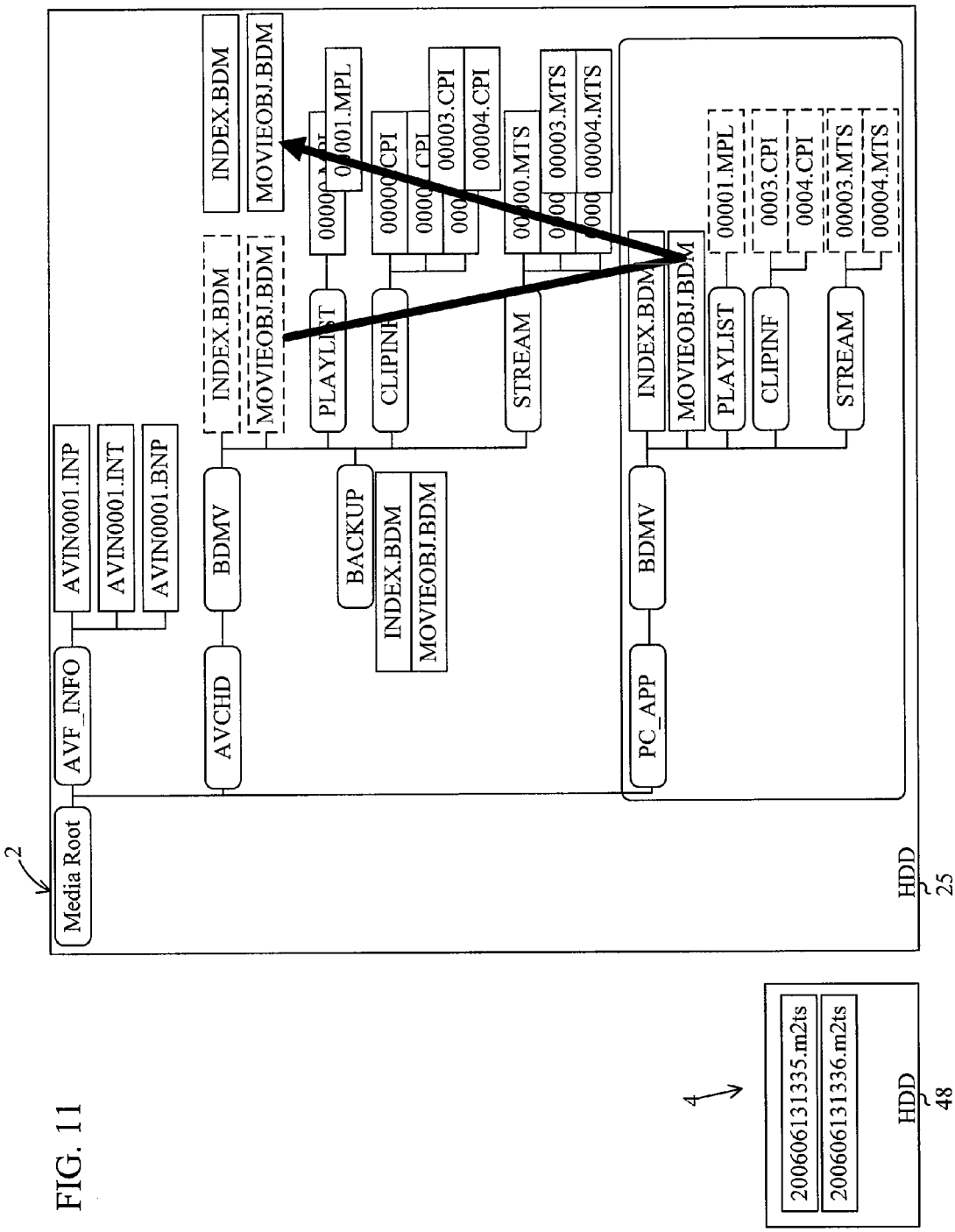
FIG. 11 illustrates a procedure for transferring content from the personal computer to the HDD in the digital video camera.

FIG. 11 illustrates the process performed in this phase on the storage area of the HDD 25 in the digital video camera 2.

The movie object file is rewritten first. More specifically, after the movie object file AVCHD¥BDMV¥MOVIEOBJ.BDM in the folder AVCHD¥BDMV is deleted, the movie object file PC_APP¥BDMV¥MOVIEOBJ.BDM in the temporary folder PC_APP¥BDMV is moved into the folder AVCHD¥BDMV.

Subsequently, the index file is rewritten. More specifically, after the index file AVCHD¥BDMV¥INDEX.BDM in the folder AVCHD¥BDMV is deleted, the index file PC_APP¥BDMV¥INDEX.BDM in the temporary folder PC_APP¥BDMV is moved into the folder AVCHD¥BDMV.

Phase 4

Figure 12:
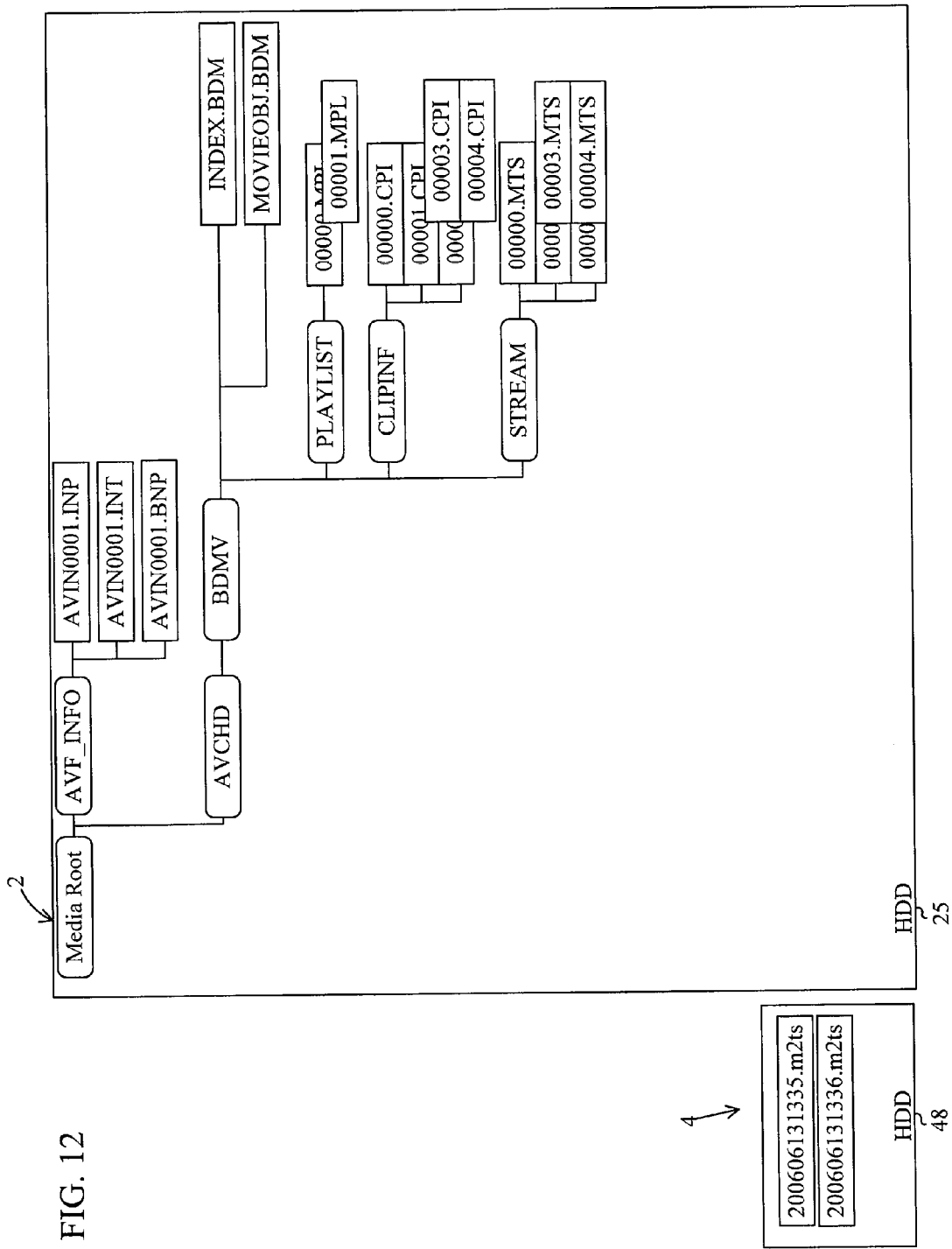
FIG. 12 illustrates a procedure for transferring content from the personal computer to the HDD in the digital video camera.

All of the temporary folders created in the storage area of the HDD 25 in the digital video camera 2 are deleted. This process can be accomplished in a significantly short amount of time. FIG. 12 illustrates the process performed in this phase on the storage area of the HDD 25 in the digital video camera 2. As shown in FIG. 12, the folder BACKUP, which was created for backing up the index file and the movie object file, and all the files included therein are deleted. Thereafter, the temporary folder PC_APP, which was created when the authoring engine moves the stream file, and all the files included therein are deleted.

Phase 5

The database of AV indices, that is, the database files in the AVF_INFO folder under the root folder are updated. Note that, in the AVCHD format, the presence of the AVF_INFO folder is not mandatory. The database of the AV indices in the AVF_INFO folder provides an advantage in that the playback and editing of a stream is facilitated. However, since this is not a key point of the present invention, description is not provided here.

Figure 13:
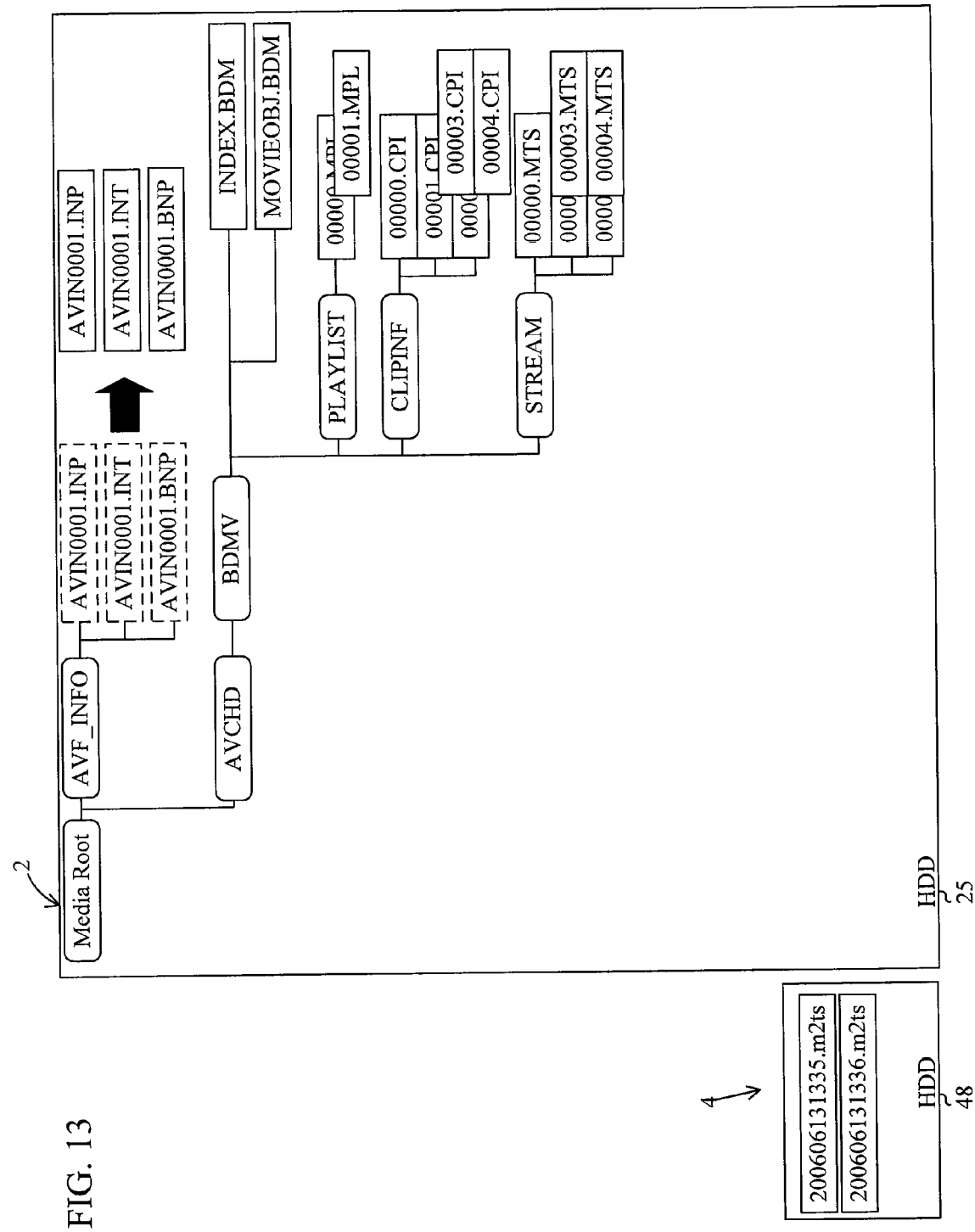
FIG. 13 illustrates a procedure for transferring content from the personal computer to the HDD in the digital video camera.

FIG. 13 illustrates the process performed in this phase on the storage area of the HDD 25 in the digital video camera 2. In this phase, the database file of the AV indices is updated.

Figure 14:
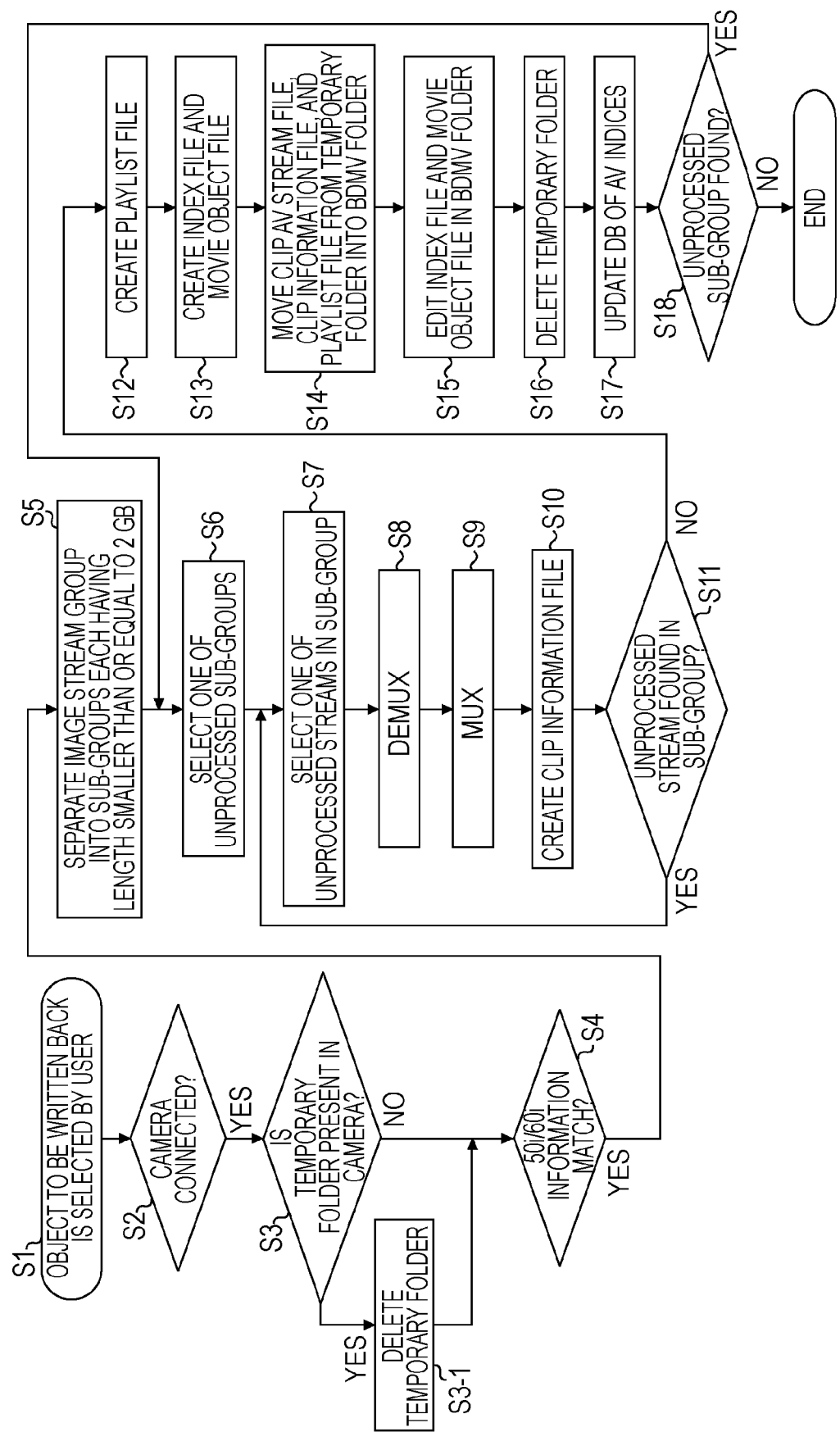
FIG. 14 is a flow chart illustrating the procedure of transferring content from the personal computer 4 to the HDD in the digital video camera.

FIG. 14 is a flow chart illustrating the procedure of transferring content from the personal computer 4 to the HDD 25 in the digital video camera 2.

The user selects a video stream group to be transferred from the personal computer 4 to the digital video camera 2 from among the video stream groups stored in the personal computer 4. Thereafter, the user starts a program for transferring a stream file to the digital video camera 2 (hereinafter referred to as a "transfer program") (step S1).

Subsequently, the transfer program checks whether the digital video camera 2 is connected to the personal computer 4 via, for example, the USB cable 3 (step S2). If it is determined that the digital video camera 2 is not connected to the personal computer 4, the transfer program displays this information on a screen so as to notify the user of this information. Thereafter, the processing routine is abnormally completed.

To determine whether the digital video camera 2 is connected to the personal computer 4, an identification file may be provided on the HDD 25 in the digital video camera 2. Alternatively, the vender ID (VID) or the product ID (PID) of the HDD 25 may be checked when the HDD 25 is connected via a USB as a mass storage device.

When the digital video camera 2 is connected to the personal computer 4, the transfer program then determines whether a temporary folder, such as PC_APP, or a temporary file is present in the HDD 25 (step S3).

As mentioned earlier, if the write-back operation is successfully completed, the temporary folders and the temporary files are all deleted. The presence of a temporary folder, such as PC_APP, or a temporary file in the HDD 25 indicates that the previous write-back operation has been abnormally completed. In such a case, the transfer program deletes all of the remaining temporary folders and temporary files (step S3-1) so as to reserve a free space, or the transfer program performs another recovery process.

Subsequently, the transfer program acquires video signal information from the connected digital video camera 2 to determine whether the video signal corresponds to the image stream that is selected by the user and that is to be transferred (step S4). More specifically, the transfer program checks the 50i/60i information associated with the connected digital video camera 2 to determine whether the 50i/60i information matches the 50i/60i information about the image stream that is selected by the user and that is to be transferred.

If the pieces of 50i/60i information do not match, for example, if the selected image stream to be transferred has the 50i video information and the digital video camera 2 can play back only a 60i image stream, the transfer program displays this information on a screen to notify the information to the user. The processing routine is then abnormally completed. Alternatively, even in such a case, the transfer program may re-encode the image stream to be transferred from 50i to 60i instead of terminating the processing routine and, subsequently, may start transferring the image stream to the digital video camera 2.

To determine the 50i/60i information, an identification file including a field having the 50i/60i information recorded therein may be provided on the HDD 25 in the digital video camera 2. Alternatively, if an AVCHD image has already been recorded on the HDD 25 in the digital video camera 2, the information about the image may be referenced. However, the AVCHD standard does not allow a 50i image and a 60i image to be concurrently present on the same medium. Therefore, an appropriate determination method is required in the actual operation.

Subsequently, the image stream group that is selected by the user and that is to be transferred is separated into sub-groups each having a length of less than or equal to 2 Gbytes (step S5). However, the present invention is not limited to the 2-Gbyte length of the sub-group.

The reason why the image is separated into sub-groups is because the process in which the temporary files for all of the stream files are created at the same time requires a significant large amount of processing time. If the amount of processing time is large, the possibility of an occurrence of an abnormal state increases during the processing. For example, the USB cable 3 that connects the digital video camera 2 to the personal computer 4 may be accidentally pulled out or the digital video camera 2 may be accidentally powered off.

For example, assume that the USB cable 3 is accidentally pulled out while a 20 Gbyte image stream group is being transferred to the digital video camera 2. If the 20 Gbyte image stream group is transferred as one group, the USB cable 3 is pulled out before the database update process is performed, which is to be performed after the transfer of the one group is completed. At that time, even the image streams that have already been transferred are not considered to have a "transfer completed" status. Thus, the digital video camera 2 cannot recognize the image streams that have already been transferred. That is, although some of the image streams have already been transferred, the write-back operation of all the stream files is considered to fail. In contrast, if the sub-groups each having a length of less than or equal to 2 Gbytes are transferred and the transfer of the image stream including data of the 11th Gbyte of the original 20 Gbyte image stream fails, the digital video camera 2 determines that the image streams prior to the image stream including data of the 10th Gbyte, which is the image stream immediately prior to the transfer-failure image stream, have been successfully transferred.

After an image stream group to be transferred is separated into sub-groups each having a length of less than or equal to 2 Gbytes, the transfer program performs an authoring process in which the image streams are written back from the personal computer 4 to the digital video camera 2 on a sub-group basis.

The transfer program selects one sub-group from among the unprocessed sub-groups first (step S6). Subsequently, the transfer program selects one of the unprocessed image streams (i.e., a clip AV stream file) from the selected sub-group (step S7) and copies the selected image stream into a temporary folder PC_APP¥BDMV¥STREAM created on the HDD 25 in the digital video camera 2 as a temporary file. Since the personal computer 4 recognizes the HDD 25 as a USB-connected mass storage file, the transfer program can easily perform such a file copy operation.

Subsequently, the transfer program creates a clip information file using the temporary file created in the temporary folder PC_APP¥BDMV¥STREAM (step S8). More specifically, the transfer program temporarily separates (demultiplexes) the clip AV stream file having the MPEG2-TS format into a video stream, an audio stream, and another stream (e.g., a stream of caption information) (step S8). Thereafter, the transfer program integrates (multiplexes) the separated streams into an MPEG2-TS stream again (step S9). Subsequently, the transfer program creates a clip information file associated with the clip AV stream file using a variety of parameters acquired during demultiplexing and multiplexing of the image stream (step S10). The transfer program then stores the clip information file in the folder CLIPINF within the folder PC_APP¥BDMV.

The transfer program sequentially executes the processes from step S8 to step S10 for each of the clip AV stream files included in the sub-group (step S11).

In this way, the transfer program creates the clip information files for all the streams in the sub-group. Thereafter, the transfer program creates a playlist file for all the clip information files and clip information files for the sub-group (step S12). The transfer program then stores the playlist file in the folder PLAYLIST within the folder PC_APP¥BDMV.

The amount of processing time required for the loop consisting of steps S7 to S11 is considered to be significantly large in this processing routine.

Subsequently, the transfer program creates an index file INDEX.BDM and a movie object file MOVIEOBJ.BDM associated with the created playlist file in the folder PC_APP¥BDMV (step S13). Thus, a BDMV tree for the sub-group currently being processed is accomplished in the temporary folder PC_APP.

At that time, the BDMV tree for the sub-group currently being processed is accomplished in the temporary folder PC_APP. This BDMV tree has a structure that is exactly the same as that of the BDMV tree used for recording stream data while following the AVCHD format (i.e., AVCHD¥BDMV), as shown in FIG. 7.

Subsequently, the transfer program moves all of the playlist files (i.e., all of the files having a file extension "MPL" in the folder PC_APP¥BDMV¥PLAYLIST), all of the clip information files (i.e., all of the files having a file extension "CPI" in the folder PC_APP¥BDMV¥CLIPINF), and all of the clip AV stream files (i.e., all of the files having a file extension "MTS" in the folder PC_APP¥BDMV¥STREAM) into the original BDMV tree of the digital video camera 2 (i.e., into the corresponding sub-folders of the folder AVCHD¥BDMV) (step S14). Since such a moving operation in the HDD 25 is performed simply by changing the file paths, the amount of the required processing time is significantly small.

Thereafter, the transfer program updates the index file INDEX.BDM and the movie object file MOVIEOBJ.BDM in the original BDMV folder of the digital video camera 2 so as to add the playlist created at step S12 (step S15). Before the transfer program updates the index file and the movie object file, the transfer program creates backup files of these files in the folder BACKUP.

Thus, the write-back operation of the image stream on a sub-group basis is completed. At that time, the transfer program deletes the temporary folders PC_APP and BACKUP used (step S16).

Subsequently, the transfer program edits the database of the AV indices in the folder AVF_INFO (step S17). Since the database of the AV indices is not mandatory for the AVCHD format and the details of the database are not key points of the present invention, further description is not provided here.

Thereafter, the transfer program sequentially executes the processes of the loop consisting of steps S6 to S17 for each of the sub-groups (step S18). Thus, the transfer program writes back all of the image streams that are selected by the user. Accordingly, the image streams are transferred from the personal computer 4 to the digital video camera 2.

If the USB cable 3 is accidentally pulled out, the personal computer 4 or the digital video camera 2 is accidentally powered off, or another failure happens during the write-back operation from the personal computer 4 to the digital video camera 2 so that the process is stopped, the temporary folder PC_APP remains undeleted on the HDD 25 in the digital video camera 2. Such a temporary folder is only garbage in a memory space, and therefore, the garbage may reduce the available recording time of the digital video camera 2. The transfer program running on the personal computer 4, at step S3, deletes the temporary file remaining undeleted on the HDD 25 so as to recover the storage area as a free space. Additionally, if the digital video camera 2 detects the presence of a temporary folder on the HDD 25 thereof when the digital video camera 2 is in a stand-alone state in which the digital video camera 2 is not connected to the personal computer 4 via the USB, the digital video camera 2 may autonomously delete the temporary folder.

As described above, according to the present embodiment, the data processing system 1 can retrieve an image stream from the HDD digital video camera 2 to the personal computer 4 and write back the image stream to the HDD digital video camera 2 that records an image stream in the AVCHD format (i.e., additional AVCHD recording).

In addition, when an image stream is written back in the AVCHD format, image stream data of a clip AV stream needs to be demultiplexed and, subsequently, multiplexed again so as to reconstruct the clip information file and the playlist file. Temporary folders used at that time are created on the HDD 25 in the digital video camera 2 that is a target of the write-back operation. Accordingly, the amount of the processing time required for the write-back operation can be advantageously reduced, the free space on the HDD 48 in the personal computer 4 can be advantageously increased, and a negative impact of abnormal completion of the transfer program caused by, for example, accidental pull-out of the USB cable 3 can be advantageously reduced.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing system comprising:
an information processing apparatus including a controlling unit; and
a recording and playback apparatus connected to the information processing apparatus via a communicating unit, the recording and playback apparatus including a first recording unit and a second recording unit, the controlling unit of the information processing apparatus transferring a first data stream file and a first management information file used for managing the first data stream file to the recording and playback apparatus, the first recording unit recording a second data stream file and a second management information file used for managing the second data stream file thereon using a predetermined directory structure, the second recording unit recording the first data stream file and the first management information file transferred from the information processing apparatus thereon using the predetermined directory structure;

wherein,
after the controlling unit of the information processing apparatus transfers the first data stream file and the first management information file to the second recording unit, the controlling unit additionally records or updates the second data stream file and the second management information file that are recorded on the first recording unit based on the corresponding first data stream file and the first management information file recorded on the second recording unit, and
the controlling unit of the information processing apparatus stores predetermined files included in the first management information file in a backup folder provided in the first recording unit before additionally recording or updating the second data stream file and the second management information file.

2. The data processing system according to claim 1, wherein:
the predetermined directory structure includes a data stream file folder for storing a data stream file and a management information file folder for storing a management information file, the controlling unit of the information processing apparatus transfers the first data stream file into the data stream file folder located in the second recording unit, the controlling unit creates the first management information file using the first data stream file stored in the data stream file folder, and stores the created first management information file in the management information file folder located in the second recording unit, and
after the controlling unit moves the data stream file stored in the data stream file folder located in the second recording unit and the management information file stored in the management information file folder located in the second recording unit to the corresponding folders located in the first recording unit, the controlling unit deletes the recorded information in the second recording unit.

3. The data processing system according to claim 2, wherein:
the predetermined directory structure includes, immediately below a predetermined folder for storing a movie stream, a stream folder for storing each of movie stream files, an attribute information file folder for storing an attribute information file associated with each of the movie stream files, and a playlist folder for storing a playlist file including information associated with an order in which the movie stream files in the stream folder are played back, and at least one management information file including information used for controlling a playback operation of the movie stream files on the basis of the playlist file, and
the controlling unit of the information processing apparatus transfers each of the movie stream files to be transferred to the stream folder in the second recording unit, creates the attribute information file on the basis of a parameter obtained by separating each of the movie stream files in the stream folder in the second recording unit and re-integrating the separated movie stream files, stores the created attribute information file in the attribute information file folder in the second recording unit, creates a playlist file for the created attribute information file, stores the created playlist file in the playlist folder in the second recording unit, creates a management information file in the second recording unit, moves the movie stream files, the attribute information files, and the playlist file stored in the second recording unit into the corresponding folders in the first recording unit, and edits the management information file in the second recording unit in order to add the playlist file to the management information file.

4. The data processing system according to claim 3, wherein:
the controlling unit of the information processing apparatus separates a movie stream file group to be transferred into at least one sub-group each having a size smaller than or equal to a predetermined size, and
the controlling unit sequentially transfers the movie stream file to the second recording unit, generates the attribute information file and the playlist file associated with the movie stream file, and edits the management information file for each of the sub-groups.

5. The data processing system according to claim 2, wherein the controlling unit of the information processing apparatus updates an index file and a movie object file included in the second management information file recorded in the first recording unit after additionally recording the second data stream file and the second management information file.

6. The data processing system according to claim 1, wherein the predetermined files included in the first management information file in the backup folder include an index file and a movie object file.

7. An information processing apparatus for processing a data stream file, comprising:
an internal storage unit configured to store a first data stream file in a directory structure;
a communicating unit configured to connect a recording and playback apparatus thereto, the recording and playback apparatus recording a second data stream file and a second management information file used for managing the second data stream file in a predetermined directory structure; and
a file transfer controlling unit configured to transfer the first data stream file stored in the internal storage unit to the recording and playback apparatus connected to the information processing apparatus via the communicating unit;
wherein,
after the file transfer controlling unit performs control so as to record the first data stream file and the first management information file used for managing the first data stream file in the recording and playback apparatus, the file transfer controlling unit additionally records or updates the second data stream file and the second management information file that are recorded in the recording and playback apparatus based on the corresponding first data stream file and the first management information file recorded in the recording and playback apparatus, and
the filer transfer controlling unit stores predetermined files included in the first management information file in a backup folder provided in the recording and playback before additionally recording or updating the second data stream file and the second management information file.

8. The information processing apparatus according to claim 7, wherein:
the predetermined directory structure includes a data stream file folder for storing a data stream file and a management information file folder for storing a management information file,
the file transfer controlling means creates, in the recording and playback apparatus, a temporary folder in a directory structure that is the same as the predetermined directory structure, transfers the first data stream file stored in the temporary folder into the data stream file folder, and the file transfer controlling means creates the first management information file on the basis of the first data stream file transferred into the recording and playback apparatus, and stores the created first management information file in the management information file folder located in the temporary folder.

9. The information processing apparatus according to claim 8, wherein, after the file transfer controlling means moves the data stream file and the management information file from the temporary folder to the corresponding folders in the predetermined directory structure in the recording and playback apparatus, the file transfer controlling means deletes the temporary folder.

10. The information processing apparatus according to claim 9, wherein:
in the recording and playback apparatus, the predetermined directory structure includes, immediately below a predetermined folder for storing a movie stream, a stream folder for storing each of the movie stream files, an attribute information file folder for storing an attribute information file associated with each of the movie stream files, and a playlist folder for storing a playlist file including information associated with an order in which the movie stream files in the stream folder are played back, and at least one management information file including information used for controlling a playback operation of the movie stream files on the basis of the playlist file
in the file transfer controlling means transfers each of the movie stream files stored in the internal recording means to the stream folder in the temporary folder, creates the attribute information file on the basis of a parameter obtained by separating each of the movie stream files in the stream folder below the temporary folder and re-integrating the separated movie stream files, stores the created attribute information file in the attribute information file folder below the temporary folder, creates a playlist file for the created attribute information file, stores the created playlist file in the playlist folder below the temporary folder, creates a management information file below the temporary folder, moves the movie stream files, the attribute information files, and the playlist file stored in the temporary folder into the corresponding folders in the predetermined directory structure, and edits the management information file in the predetermined directory structure in order to add the playlist file to the management information file.

11. The information processing apparatus according to claim 10, wherein:
the file transfer controlling means separates a movie stream file group to be transferred and stored in the internal storage means into at least one sub-group each having a size smaller than or equal to a predetermined size, and
the file transfer controlling means sequentially transfers the movie stream file to the recording and playback apparatus, generates the attribute information file and the playlist file associated with the movie stream file, and edits the management information file for each of the sub-groups.

12. The information processing apparatus according to claim 8, wherein, when the recording and playback apparatus is connected to the communicating means, the file transfer controlling means deletes the temporary folder remaining in the recording and playback apparatus.

13. The information processing apparatus according to claim 7, wherein the file transfer controlling unit updates an index file and a movie object file included in the second management information file recorded in the recording and playback apparatus after additionally recording the second data stream file and the second management information file.

14. A method for processing information and for transferring a first data stream file stored in an information processing apparatus to a recording and playback apparatus, the recording and playback apparatus recording a second data stream file and a second management information file used for managing the second data stream file using a predetermined directory structure, the method comprising the steps of:
(a) performing control so as to record the first data stream file and a first management information file used for managing the first data stream file in the recording and playback apparatus; and
(b) performing control so as to additionally record or update the second data stream file and the second management information file that are recorded in the recording and playback apparatus based on the corresponding first data stream file and the first management information file recorded in the recording and playback apparatus,
wherein,
at step (b), predetermined files included in the first management information file are stored in a backup folder provided in the recording and playback apparatus before additionally recording or updating the second data stream file and the second management information file.

15. The method for processing information according to claim 14, wherein:
the predetermined directory structure includes a data stream file folder for storing a data stream file and a management information file folder for storing a management information file, and at step (a), a temporary folder in a directory structure that is the same as the predetermined directory structure is created in the recording and playback apparatus, the first data stream file stored in the temporary folder is transferred into the data stream file folder, the first management information file is created on the basis of the first data stream file transferred into the recording and playback apparatus, and the created first management information file is stored in the management information file folder located in the temporary folder.

16. The method for processing information according to claim 15, wherein, at step (b), after the data stream file and the management information file are moved from the temporary folder to the corresponding folders in the predetermined directory structure, the temporary folder is deleted from the recording and playback apparatus.

17. The method for processing information according to claim 15, wherein:
in the recording and playback apparatus, the predetermined directory structure includes, immediately below a predetermined folder for storing a movie stream, a stream folder for storing each of the movie stream files, an attribute information file folder for storing an attribute information file associated with each of the movie stream files, and a playlist folder for storing a playlist file including information associated with an order in which the movie stream files in the stream folder are played back, and at least one management information file including information used for controlling a playback operation of the movie stream files on the basis of the playlist file, and
wherein, at step (a), each of the movie stream files is transferred to the stream folder in the temporary folder, the attribute information file is created on the basis of a parameter obtained by separating each of the movie stream files in the temporary folder and re-integrating the separated movie stream files, the created attribute information file is stored in the attribute information file folder below the temporary folder, a playlist file is created for the created attribute information file, and the created playlist file is stored in the playlist folder below the temporary folder, and
wherein, at step (b), a management information file is created below the temporary folder, the movie stream files, the attribute information files, and the playlist file stored in the temporary folder are moved into the corresponding folders in the predetermined directory structure, and the management information file in the predetermined directory structure is edited in order to add the playlist file to the management information file.

18. The method for processing information according to claim 17, wherein
a movie stream file group to be transferred is separated into at least one sub-group each having a size smaller than or equal to a predetermined size, and
wherein steps (a) and (b) are sequentially performed for each of the sub-groups.

19. The method for processing information according to claim 15, further comprising the step of: deleting the temporary folder remaining in the recording and playback apparatus when the recording and playback apparatus is connected to the information processing apparatus.

20. A recording and playback apparatus for recording and playing back data, comprising:
a communicating unit configured to connect an information processing apparatus thereto, the information processing apparatus transferring a first data stream file;

a first recording unit configured to record a second data stream file and a second management information file used for managing the second data stream file thereon using a predetermined directory structure;

a second recording unit configured to record the first data stream file and the first management information file transferred from the information processing apparatus thereon using the predetermined directory structure;

a record controlling unit configured to perform control so as to record the first data stream file and the first management information file on the second recording unit; and an additional recording and updating unit configured to additionally record or update the second data stream file and the second management information file that are recorded in the first recording unit based on the corresponding first data stream file and the first management information file recorded in the second recording unit, wherein, the additional recording and updating unit stores predetermined files included in the first management information file in a backup folder provided in the first recording unit before additionally recording or updating the second data stream file and the second management information file.

21. The recording and playback apparatus according to claim 20, wherein the predetermined directory structure includes a data stream file folder for storing a data stream file and a management information file folder for storing a management information file, the record controlling unit transfers the first data stream file into the data stream file folder located in the second recording unit, the record controlling unit creates the first management information file using the first data stream file stored in the data stream file folder, and stores the created first management information file in the management information file folder located in the second recording unit, and after the additional recording and updating unit moves the data stream file stored in the data stream file folder located in the second recording unit and the management information file stored in the management information file folder located in the second recording unit to the corresponding folders located in the first recording unit, the additional recording and updating unit deletes the recorded information in the second recording unit.

22. The recording and playback apparatus according to claim 21, wherein the predetermined directory structure includes, immediately below a predetermined folder for storing a movie stream, a stream folder for storing each of the movie stream files, an attribute information file folder for storing an attribute information file associated with each of the movie stream files, and a playlist folder for storing a playlist file including information associated with an order in which the movie stream files in the stream folder are played back, and at least one management information file including information used for controlling a playback operation of the movie stream files on the basis of the playlist file, the record controlling unit transfers each of the movie stream files to be transferred to the stream folder in the second recording unit, creates the attribute information file on the basis of a parameter obtained by separating each of the movie stream files in the stream folder in the second recording unit and re-integrating the separated movie stream files, stores the created attribute information file in the attribute information file folder in the second recording unit, creates a playlist file for the created attribute information file, stores the created playlist file in the playlist folder in the second recording unit, and creates a management information file in the second recording unit, and the additional recording and updating unit moves the movie stream files, the attribute information files, and the playlist file stored in the second recording unit into the corresponding folders in the first recording unit, and edits the management information file in the second recording unit in order to add the playlist file to the management information file.

23. The recording and playback apparatus according to claim 22, wherein the record controlling unit separates a movie stream file group to be transferred into at least one sub-group each having a size smaller than or equal to a predetermined size, and the record controlling unit sequentially transfers the movie stream file to the second recording unit, generates the attribute information file and the playlist file associated with the movie stream file, and edits the management information file for each of the sub-groups.

24. The recording and playback apparatus according to claim 20, wherein the additional recording and updating unit updates an index file and a movie object file included in the second management information file recorded in the first recording unit after additionally recording the second data stream file and the second management information file.

25. A non-transitory computer readable medium storing a computer-readable program for causing a computer to transfer a first data stream file stored in an information processing apparatus to a recording and playback apparatus, the recording and playback apparatus recording a second data stream file and a second management information file used for managing the second data stream file thereon using a predetermined directory structure, the program comprising the steps of:

(a) performing control so as to record the first data stream file and a first management information file used for managing the first data stream file in the recording and playback apparatus; and (b) performing control so as to additionally record or update the second data stream file and the second management information file that are recorded in the recording and playback apparatus based on the corresponding first data stream file and the first management information file recorded in the recording and playback apparatus, wherein, at step (b), predetermined files included in the first management information file are stored in a backup folder provided in the recording and playback apparatus before additionally recording or updating the second data stream file and the second management information file.

26. A data processing system comprising:

an information processing apparatus including control means; and a recording and playback apparatus connected to the information processing apparatus via communicating means, the recording and playback apparatus including first recording means and second recording means, the control means of the information processing apparatus transferring a first data stream file and a first management information file used for managing the first data stream file to the recording and playback apparatus, the first recording means recording a second data stream file and a second management information file used for managing the second data stream file thereon using a predetermined directory structure, the second recording means recording the first data stream file and the first management information file transferred from the information processing apparatus thereon using the predetermined directory structure;

wherein, after the control means of the information processing apparatus transfers the first data stream file and the first management information file to the second recording means, the control means additionally records or updates the second data stream file and the second management information file that are recorded on the first recording means based on the corresponding first data stream file and the first management information file recorded on the second recording means, and the controlling means of the information processing apparatus stores predetermined files included in the first management information file in a backup folder provided in the first recording means before additionally recording or updating the second data stream file and the second management information file.

* * * * *